United States Patent

Bitterlin et al.

[11] 4,158,003
[45] Jun. 12, 1979

[54] METALLIZED BIS-FORMAZANS

[75] Inventors: Otto Bitterlin; Paul Dussy, both of Basel, Switzerland

[73] Assignee: Ciba-Geigy AG, Basel, Switzerland

[21] Appl. No.: 741,017

[22] Filed: Nov. 11, 1976

Related U.S. Application Data

[63] Continuation of Ser. No. 634,732, Nov. 25, 1975, abandoned, which is a continuation of Ser. No. 512,319, Oct. 4, 1974, abandoned, which is a continuation of Ser. No. 274,206, Jul. 24, 1972, abandoned, which is a continuation of Ser. No. 883,612, Dec. 9, 1969, abandoned.

Foreign Application Priority Data

Dec. 10, 1968 [CH] Switzerland .............. 18394/68

[51] Int. Cl.² ............................................. C09B 45/48
[52] U.S. Cl. ................. 260/146 T; 260/145 C; 260/146 R; 260/146 D; 260/147; 260/148; 260/149; 260/193
[58] Field of Search ........... 260/146 R, 146 D, 146 T, 260/148, 145 C

[56] References Cited

U.S. PATENT DOCUMENTS

| | | | |
|---|---|---|---|
| 3,068,219 | 12/1962 | Beffa et al. | 260/146 R |
| 3,244,690 | 4/1966 | Steinemann | 260/146 R |
| 3,547,901 | 12/1970 | Lienhard et al. | 260/146 D |

Primary Examiner—Charles F. Warren
Attorney, Agent, or Firm—Wenderoth, Lind & Ponack

[57] ABSTRACT

Heavy-metal-containing bisformazan dyestuffs of the formula

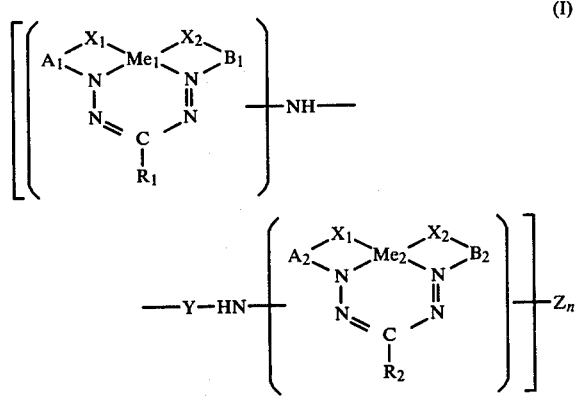

wherein $A_1$, $A_2$, $B_1$ and $B_2$ are the same or different and each represents an unsubstituted or substituted o-phenylene radical or an o-naphthylene radical, $R_1$ and $R_2$ are the same or different and each represent a monovalent organic radical, $Me_1$ and $Me_2$ each represent nickel or copper, $X_1$ and $X_2$ are the same or different and each represents a metal-binding substituent connected to $A_1$, $B_1$, $A_2$ or $B_2$ in a position ortho to that to which the nitrogen is linked, Y represents the radical of a dibasic carboxylic acid or a radical which is derived from an, at least, bifunctional heterocyclic compound, Z represents a salt-forming water-solubilizing group, dissociating acid in water, selected from $-SO_3^\ominus M^\oplus$ and $-COO^\ominus M^\oplus$ wherein $M^\oplus$ represents a cation, n represents a number from 2 to 6, and wherein aromatic radicals present may contain further substituents known per se for use in azo dyestuffs, and wherein the grouping —NH—Y—HN— is bound directly or via a bridging member to a ring carbon atom of $A_1$, $A_2$, $B_1$, $B_2$, $R_1$ or $R_2$, which bis-formazans are substantive dyestuffs suitable for the dyeing or printing of textile material made from natural or regenerated cellulose. The aforesaid bis-formazan dyestuffs are distinguished by high coloring strength and substantivity to cellulose textile material. The dyeings obtained therewith are of a pure shade of color and have good fastness properties, especially to light and wet.

10 Claims, No Drawings

METALLIZED BIS-FORMAZANS

This application is a continuation of application Ser. No. 634,732, filed Nov. 25, 1975 (now abandoned), which is a continuation of application Ser. No. 512,319, filed Oct. 4, 1974 (now abandoned), which is a continuation of application Ser. No. 274,206, filed July 24, 1972 (now abandoned), which is in turn a continuation of application Ser. No. 883,612, filed Dec. 9, 1969 (now abandoned).

DESCRIPTION OF THE INVENTION

The present invention relates to new heavy-metal-containing bisformazan dyestuffs, processes for the production thereof, their use for the dyeing or printing of organic materials, especially textile material made from natural or regenerated cellulose, particularly cotton or staple fibre, as well as, as an industrial product, the material dyed or printed using these new dyestuffs.

Heavy-metal-containing formazan dyestuffs, suitable for the dyeing of cellulose, have recently become of greater interest. Such formazan dyestuffs, which have been hitherto known, belong to the class of reactive dyestuffs. However, reactive dyestuffs have only a low affinity to the fibres and in the unfixed state they can therefore be very easily washed out.

Surprisingly, it has now been found that, by selection of specific substituents, valuable heavy-metal-containing bisformazan dyestuffs are obtained which produce on the cellulose fibres, direct dyeings having very good fastness to light and wet processing. These new, substantive, heavy-metal-containing bisformazan dyestuffs correspond to the general formula I:

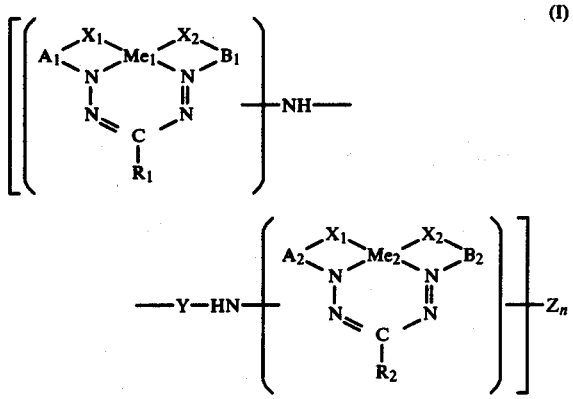

wherein $A_1$, $A_2$, $B_1$ and $B_2$ are the same or different and each represent an unsubstituted or substituted o-phenylene radical or an o-naphthylene radical, $R_1$ and $R_2$ are the same or different and each represent a monovalent organic radical, $Me_1$ and $Me_2$ each represent nickel or copper, $X_1$ and $X_2$ are the same or different and each represent a metal-binding substituent connected to $A_1$, $B_1$, $A_2$ or $B_2$ in a position ortho to that to which the nitrogen is linked, Y represents the radical of a dibasic carboxylic acid or a radical which is derived from an, at least, bifunctional heterocyclic compound, Z represents a salt-forming water-solubilising group, dissociating acid in water, selected from $-SO_3^\ominus M^\oplus$ and $-COO^\ominus M^\oplus$ wherein $M^\oplus$ represents a cation, n represents a number from 2 to 6, and wherein aromatic radicals present may contain further substituents known per se for use in azo dyestuffs, and wherein the grouping —NH—Y—HN— is bound directly or via a bridging member to a ring carbon atom of $A_1$, $A_2$, $B_1$, $B_2$, $R_1$ or $R_2$.

Primarily, $A_1$, $A_2$, $B_1$ and/or $B_2$ represents an o-phenylene radical, which can also contain further ring substituents common in azo dyestuffs and, optionally, also an o-naphthylene radical.

As a monovalent organic radical, $R_1$ or $R_2$ represents, for example, an aliphatic, an aromatic or a heterocyclic nitrogen-containing radical, the nitro group or the cyano group. As aliphatic radical, $R_1$ or $R_2$ can be, e.g. the carboxyl group, a modified carboxyl group, e.g. an esterified or amidated carboxyl group, especially a carbalkoxy group or a carboxylic acid amide group derived from $NH_3$, primary or secondary amines, a straight- or branched-chain alkyl or alkenyl group (in the latter case particularly a $\Delta_2$-alkenyl group) having preferably up to 8 carbon atoms such as the methyl, ethyl, n-propyl, allyl, tert. butyl, iso-amyl, n.hexyl and n.octyl group, which can be optionally substituted by halogen such as fluorine or chlorine, by the hydroxyl group, cyano group or a lower alkoxy group, also an acyl group, e.g. an alkanoyl group such as the acetyl group or propionyl group or the benzoyl group, a lower alkylsulphonyl group such as the methyl, ethyl or butylsulphonyl group, an arylsulphonyl group such as the phenylsulphonyl group, or an aralkyl group such as the benzyl or phenethyl group. As an aromatic radical $R_1$ or $R_2$ represents preferably a phenyl or a naphthyl group and as heterocyclic nitrogen containing radical e.g. a benzofused nitrogen-containing five-membered radical such as for example the benzimidazole-2-radical.

As a metal-binding substituent, $X_1$ and $X_2$ can be derived, e.g. from a phenolic hydroxyl group, the carboxyl group or from an acid imido group, substituted, e.g. by the radical of an organic sulphonic acid.

If Y represents the radical of a dibasic carboxylic acid, it can be derived from an inorganic or organic dibasic carboxylic acid. In the first case, the carbonyl group —CO— is especially suitable for Y and in the second case, the radical of a preferably conjugately unsaturated dicarboxylic acid is applicable such as, for example, the radicals:

—CO—CH=CH—CO—

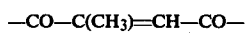
—CO—C(CH₃)=CH—CO—

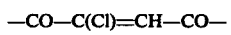
—CO—C(Cl)=CH—CO—

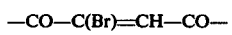
—CO—C(Br)=CH—CO—

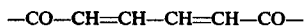
—CO—CH=CH—CH=CH—CO— or the radical of an aromatic dicarboxylic acid, optionally containing bridge members and being either unsubstituted or substituted, e.g. by halogen up to atomic number 35 and/or lower alkyl or alkoxy groups such as methyl, ethyl, propyl, methoxy, ethoxy or propoxy groups, the sulphonic acid or particularly the carboxy group, such as, e.g. the radicals:

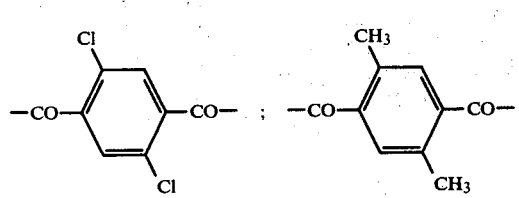
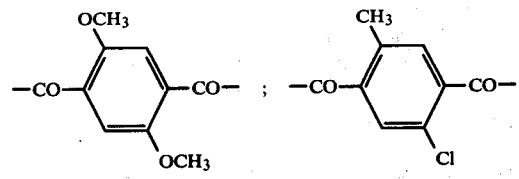
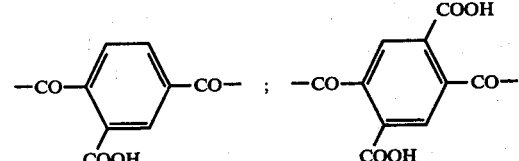
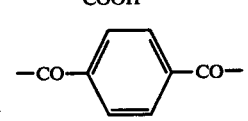
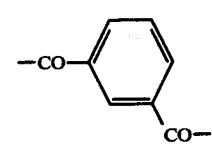
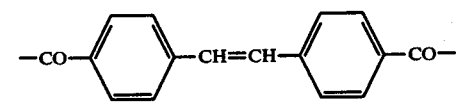
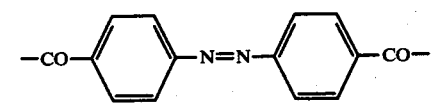
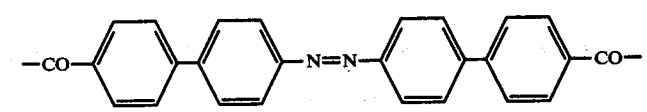
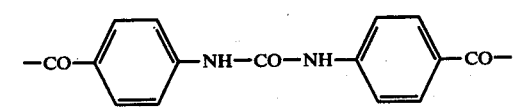
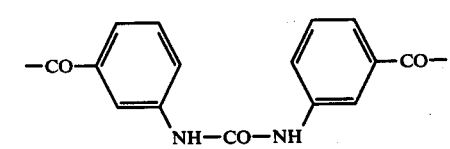
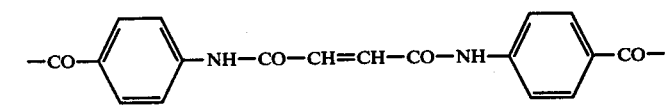
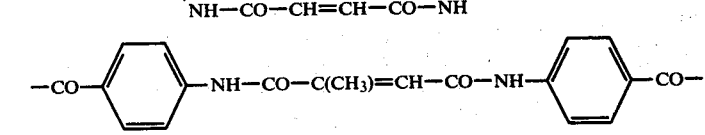

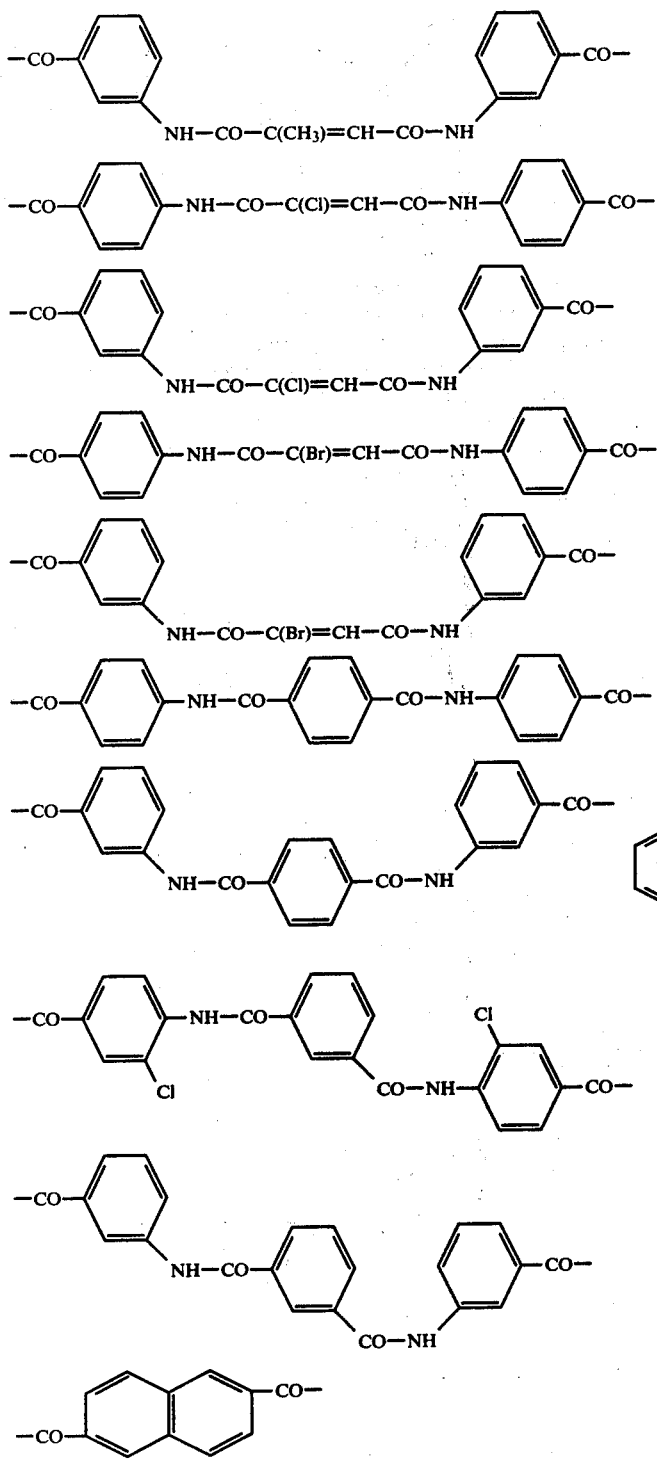
or the radical of a dicarbamide acid
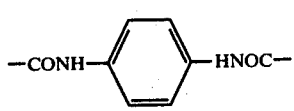
which builds up in the end dyestuff a urea bridge.
If Y represents a radical derived from an, at least, bifunctional, heterocyclic compound, then it can be, e.g. a five-membered nitrogen heterocycle which can be condensed with or substituted by carbocycles, such as, e.g. the radicals:
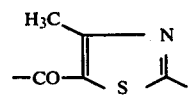

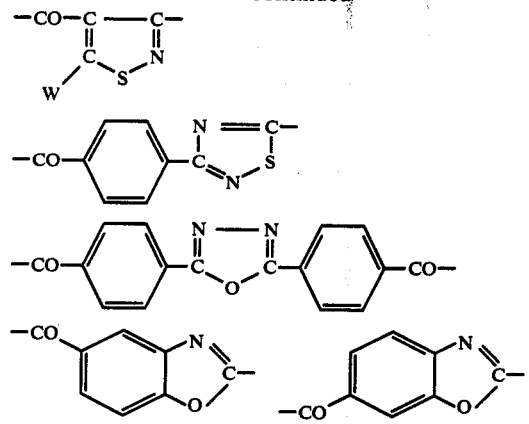
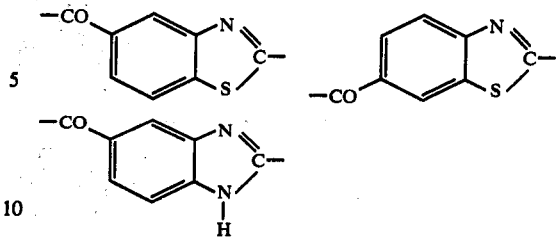

or it can be a six-membered nitrogen heterocycle, optionally substituted or condensed with carbocycles, preferably a diazine or triazine radical, as well as radicals of primary condensation products, e.g. from cyanuric chloride, cyanuric bromide, 2,4,6-trichloro-, 2,4,6-tribromo- or 2,4,6-trifluoro-pyrimidine, 2,4,5,6-tetrachloro-, 2,4,5,6-tetrabromo- or 5-chloro-2,4,6-trifluoro-pyrimidine or 2,4-dichloro-pyrimidine-5- or -6-carboxylic acid with ammonia, amines, alkanolamines, phenols or thiophenols such as, e.g. the radicals:

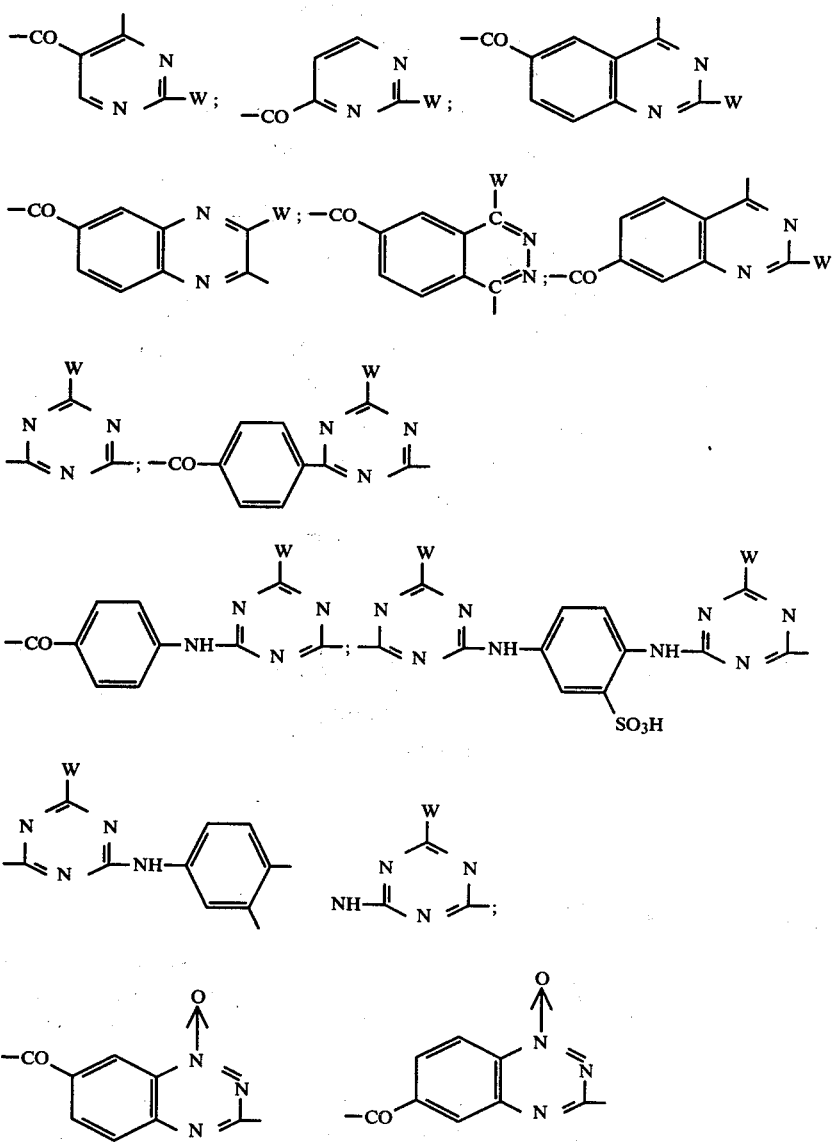

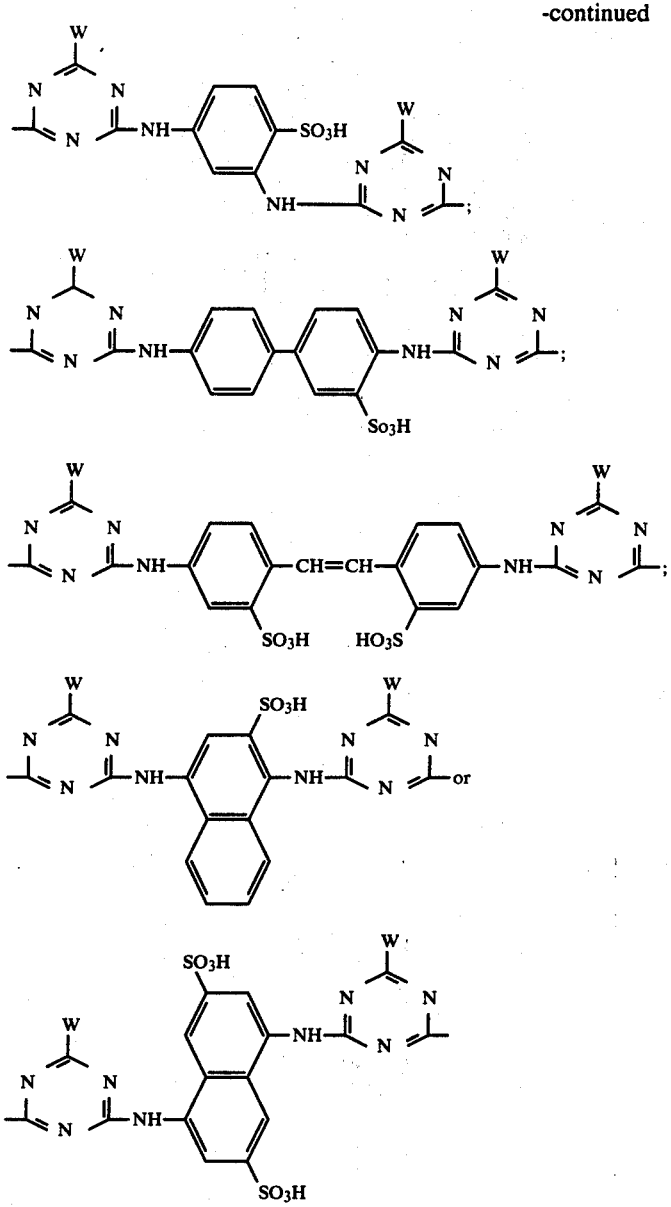

In these stated 5- or 6-membered nitrogen-containing heterocyclic radicals, W denotes, e.g. the group —$NH_2$, —NH-lower-alkyl, —NH-aryl, —OH, —O-lower-alkyl, —O-aryl or —S-aryl.

As salt-forming, water-solubilising groups, dissociating acid in water and corresponding to Z, the bisformazan dyestuffs according to the invention preferably contain sulphonic acid groups and in addition, or in place of the latter, also carboxyl groups, phosphonic acid groups or disulphimide groups. In the dyestuff molecule, Z can also have a variety of these meanings. These groups, corresponding to Z, can be in the form of the free acid or preferably in the form of the alkali salts of the latter, e.g. in the form of lithium, potassium or ammonium salts, or mostly of the sodium salts.

In addition to these essential substituents Z and —NH—Y—NH—, the bisformazan dyestuffs according to the invention can contain, preferably in $A_1$, $A_2$, $B_1$ and $B_2$ as well as in the aromatic rings of $R_1$, $R_2$ and Y, further substituents common in azo dyestuffs, preferably as ring substituents, e.g. lower alkyl groups such as the methyl, ethyl, n- or iso-propyl or tert. butyl group; ether groups, preferably lower alkoxy groups such as the methoxy, ethoxy or propoxy group; halogen up to atomic number 35 such as fluorine, chlorine or bromine; sulphonic acid amide groups, unsubstituted or N-mono- or N,N-di-substituted by lower alkyl groups; lower alkylsulphonyl groups such as the methyl, ethyl or butylsulphonyl group, the hydroxyl or the nitro group. The same accordingly applies for the starting materials.

Of particular interest are heavy-metal-containing bisformazan dyestuffs of the formula I which are composed of two like formazan radicals and especially those wherein $A_1$ and $A_2$ each represent the same o-phenylene radical either unsubstituted or substituted by a sulphonic acid group, halogen, lower alkyl, lower alkoxy, lower alkylsulphonyl, sulphamoyl, N-mono- or N,N-di-lower alkyl sulphonic acid amide, or an o-naphthylene radical optionally substituted by sulphonic acid groups, but in particular a disulphonated o-phenylene radical, B₁ and B₂ each represent the same o-phenylene radical either unsubstituted or substituted by sulphonic acid groups, carboxylic acid groups, halogen, lower alkylsulphonyl or sulphamoyl or an o-naphthylene radical optionally further substituted by sulphonic acid groups, but particularly an o-phenylene radical substituted by the bridging member —NH—Y—HN— preferably in p-position to the nitrogen linkage, R₁ and R₂ each represent a phenyl radical either unsubstituted or substituted by the hydroxyl group and/or the sulphonic acid group or halogen; a naphthyl radical, carboxylic acid or the radical of a nitrogen-containing, benzo-fused 5-membered heterocyclic compound, but preferably an unsubstituted phenyl radical.

Me₁ and Me₂ represent copper, X₁ and X₂ represent —COO— and/or —O—, and Y is the bifunctional radical of a conjugately unsaturated, aliphatic or aromatic dicarboxylic acid or the radical of an, at least, bifunctional heterocyclic compound, such as the radical of fumaric acid, terephthalic acid, isophthalic acid, 2-anilido-4,6-dichloro-1,3,5-triazine, 1,4-bis-[2'-chloro-4'-anilido-1',3',5'-triazin-6'-yl]-aminobenzene-2-sulphonic acid, 1,3-bis-[2'-chloro-4'-anilido-1',3',5'-triazine-6'-yl]-aminobenzene-4-sulphonic acid, 4,4'-bis-[2''-chloro-4''-anilido-1'',3'',5''-triazin-6''-yl]-amino-diphenyl-2-sulphonic acid, 4,4'-bis-[2''-chloro-4''-anilido-1'',3'',5''-triazin-6''-yl]-aminostilbene-2,2'-disulphonic acid, 1,4-bis-[2''-chloro-4''-anilido-1'',3'',5''-triazin-6''-yl]-aminonaphthalene-2-sulphonic acid, 1,5-bis-[2''-chloro-4''-anilido-1'',3'',5''-triazin-6''-yl]-aminonaphthalene-3,7-disulphonic acid or carbonic acid or benzene 1,4-dicarboxylic acid-4',4''-dicarboxy-diphenylamide.

These preferred bisformazan dyestuffs are characterised by a special high substantivity, associated with very good dyeing properties, in particular good fastness to light and wet processing.

The heavy-metal-containing bisformazan dyestuffs of the general formula I, according to the invention, can be produced according to methods known per se. They are obtained, for example by reacting two different, or advantageously two like aminoformazan dyestuffs of the general formula II

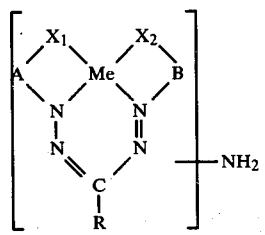
(II)

wherein A, B, R and Me have the meaning given for the symbols and X₁ and X₂ have the meanings given under formula I, and the amino group —NH₂ is bound to a ring carbon atom of A, B or R either directly or by way of a bridge member, e.g. by way of a benzoylamino bridge,
simultaneously or in stages with a reactive compound of a bifunctional acid or with a heterocyclic compound having at least two reactive substituents introducing the radical Y, to give a bisformazan dyestuff of the general formula I, and if Y still contains further reactive substituents, reacting these with ammonia or with a primary or secondary amine, or with a hydroxy or mercapto compound, and thereby so choosing the starting materials that the heavy-metal-containing bisformazan dyestuffs of the formula I contain 2 to 6 groups Z.

The starting materials of the formula II are in part known and can be produced, e.g. according to the methods given in the Swiss patent specifications 394.440, 441.571 and 441.572 as well as in the Swiss patent applications 10582/66 and 2374/67. The non-known aminoformazan dyestuffs of the formula II can be produced analogous to the methods known for the production of nitro and acyl formazan dyestuffs by usual diazotising and coupling reactions and followed by saponification of the acyl or reduction of the nitro groups to the amino group.

Examples of starting materials of formula II are the copper complexes of the following formazan compounds:

N-(2-carboxyphenyl-4-sulphonic acid)-N'-(2'-hydroxy-3'-aminophenyl-5'-sulphonic acid)-ms-phenyl-formazan, N-(2-carboxyphenyl-4-sulphonic acid)-N'-(2'-carboxy-4'-aminophenyl)-ms-phenyl-formazan, N-(2-hydroxyphenyl-5-sulphonic acid)-N'-(2'-hydroxy-3'-aminophenyl-5'-sulphonic acid)-ms-phenyl-formazan, N-(2-carboxyphenyl-4-sulphonic acid)-N'-(2'-hydroxyphenyl-5'-sulphonic acid)-ms-4''-aminophenyl-formazan, N-(2-carboxyphenyl-4-sulphonic acid)-N'-(2'-hydroxy-3'-aminophenyl-5'-sulphonic acid)-ms-naphthyl-1''-formazan, N-(2-carboxy-4-aminophenyl)-N'-(2'-hydroxyphenyl-5'-methylsulphonyl)-ms-phenyl-3''-sulphonic acid-formazan, N-(2-carboxy-4-chlorophenyl)-N'-(2'-hydroxy-3'-aminophenyl-5'-sulphonic acid)-ms-phenyl-3''-sulphonic acid formazan, N-(2-carboxy-4-methylphenyl)-N'-(2'-hydroxy-3'-aminophenyl-5'-sulphonic acid)-ms-phenyl-3''-sulphonic acid-formazan, N-(2-carboxy-4-aminophenyl)-N'-(2'-hydroxyphenyl-5'-sulphonic acid)-ms-carboxy-formazan, N-(2-carboxyphenyl-4-sulphonic acid)-N'-(2'-hydroxy-3'-aminophenyl-5'-sulphonic acid)-ms-benzimidazolyl-2''-formazan, N-(2-carboxynaphthyl-3)-N'-(2'-hydroxy-3'-aminophenyl-5'-sulphonic acid)-ms-2''-hydroxyphenyl-formazan, N-(2-carboxy-4-aminophenyl)-N'-(2'-hydroxynaphthyl-1'-4'-sulphonic acid)-ms-phenyl-formazan, N-(2-carboxyphenyl-4-sulphamoyl)-N'-(2'-hydroxy-5'-aminophenyl-3-sulphonic acid)-ms-phenyl-3''-sulphonic acid-formazan, N-(2-carboxy-4-aminophenyl)-N'-(2'-hydroxyphenyl-3',5'-disulphonic acid)-ms-2''-chlorophenyl-5''-sulphonic acid-formazan, N-(2-carboxy-4-aminophenyl)-N'-(2'-hydroxy-5'-chlorophenyl-3'-sulphonic acid)-ms-phenyl-3''-sulphonic acid-formazan, N-(2-carboxy-4-aminophenyl)-N'-(2'-hydroxy-3'-carboxyphenyl-5'-sulphonic acid)-ms-phenyl-formazan, N-(2-carboxy-5-methoxyphenyl)-N'-(2'-hydroxy-3'-aminophenyl-5'-sulphonic acid)-ms-phenyl-3''-sulphonic acid-formazan, N-(2-carboxy-4-aminophenyl)-N'-(2'-hydroxyphenyl-5-sulphamoyl)-ms-phenyl-3''-sulphonic acid-formazan, N-(2-carboxy-4-aminophenyl)-N'-(2'-hydroxy-4',5'-dichlorophenyl)-ms-phenyl-3''-sulphonic acid-formazan, N-(2-carboxy-4-aminophenyl)-N'-(2'-hydroxyphenyl-3'-sulphonic acid-5'-ethylsulphonyl)-ms-phenyl-formazan, N-(2-carboxyphenyl-4-methylaminosulphonyl)-N'-(2'-hydroxy-3'-aminophenyl-5'-sulphonic acid)-ms-phenyl-3"-sulphonic acid-formazan, N-(2-carboxyphenyl-4-methylsulphonyl)-N'-(2'-hydroxy-3'-aminophenyl-5'-sulphonic acid)-ms-phenyl-3"-sulphonic acid-formazan, N-(2-carboxyphenyl-4-dimethylaminosulphonyl)-N'-(2'-hydroxy-3'-aminophenyl-5'-sulphonic acid)-ms-phenyl-3"-sulphonic acid-formazan, and especially N-(2-carboxy-4-aminophenyl)-N'-(2'-hydroxyphenyl-3',5'-disulphonic acid)-ms-phenyl-formazan, as well as the nickel complex of N-(2-carboxyphenyl-4-sulphonic acid)-N'-(2'-hydroxy-3'-aminophenyl-5'-sulphonic acid)-ms-phenyl-formazan.

As suitable reactive compounds, introducing the radical Y, the dihalides, especially dichlorides, of the dicarboxylic acids mentioned in the description of Y are accordingly used, as well as halogen-diazines and -triazines having more than two mobile halogen atoms, whereby in the 5- or 6-membered nitrogen-containing heterocycles, W here represents a halogen atom, e.g. fluorine, chlorine and optionally also bromine. All these reactive compounds are known and can be produced by known methods.

Preferred acylation agents, introducing the radical Y, are the dihalides, in particular the dichlorides of conjugately unsaturated, aliphatic and aromatic dicarboxylic acids such as the dichlorides of fumaric acid, terephthalic acid, isophthalic acid, as well as the halides of, at least, bifunctional heterocyclic compounds such as cyanuric chloride, 1,4-bis-[2',4'-dichloro-1',3',5'-triazin-6'-yl]-aminobenzene-2-sulphonic acid, 1,3-bis-[2',4'-dichloro-1',3',5'-triazin-6'-yl]-aminobenzene-4-sulphonic acid, 4,4'-bis-[2",4"-dichloro-1",3"-5"-triazin-6"-yl]-aminodiphenyl-2-sulphonic acid, 4,4'-bis-[2",4"-dichloro-1",3",5"-triazin-6"-yl]-aminostilbene-2,2'-disulphonic acid, 1,4-bis-[2",4"-dichloro-1",3",5"-triazin-6"-yl]-aminonaphthalene-2-sulphonic acid or 1,5-bis-[2",4"-dichloro-1",3",5"-triazin-6"-yl]-aminonaphthalene-3,7-disulphonic acid or carbonic acid or benzene 1,4-dicarboxylic acid-4',4"-dicarboxy-diphenylamide.

The reaction of the aminoformazan dyestuffs of the formula II with the compounds introducing the radical Y, is performed in the usual manner, advantageously in aqueous medium and optionally in the presence of inert, easily removable, organic solvents such as tetrachloroethane, benzene, toluene, dichlorobenzene, trichlorobenzene or nitrobenzene, preferably acetone or monochlorobenzene. Advantageously, the compound introducing Y, dissolved in an organic solvent or as a fine aqueous suspension, is added dropwise at 0° to 80° C. to a neutral aqueous solution of an aminoformazan dyestuff of the formula II, advantageously in the presence of acid-buffering agents such as sodium carbonate, potassium carbonate, sodium acetate, sodium hydroxide or potassium hydroxide. If necessary, it is also possible to add to the reaction mixture agents accelerating the condensation such as, e.g. tertiary, aliphatic, aromatic or heterocyclic amines, e.g. trimethylamine, diethylaniline or pyridine.

After the addition of the acylation agent is completed, stirring is continued at this temperature until no further free amino groups are detectable.

If, after the reaction has been performed, the condensation product in Y contains substituents which are still reactive, particularly halogen atoms, this being the case, for example, with the use of cyanuric chloride, these are subsequently reacted with ammonia or a primary or secondary amine or with a hydroxy or mercapto compund. An alkylamine is advantageously used for the purpose, such as methylamine or diethylamine; an aromatic amine such as aniline, aniline sulphonic acid, naphthylamine sulphonic acid; an aminobenzenecarboxylic acid, a hydroxyaminobenzenecarboxylic acid or an aliphatic aminocarboxylic acid or aminosulphonic acid.

The same final products are also obtained by using, instead of, e.g. trihalogen triazines, a dihalogen triazine, wherein the third halogen atom is already replaced by one of the mentioned amino hydroxy or mercapto radicals, and reacting this dihalogen triazine with identical or different aminoformazan dyestuffs of the formula II.

Preparation and isolation of the heavy-metal-containing bisformazan dyestuffs of the formula I, according to the invention, are carried out by the usual methods, e.g. the obtained bisformazan dyestuff is salted out from the optionally previously neutralised solution at room temperature, using sodium chloride and/or potassium chloride. It is also possible, however, to precipitate the new bisformazan dyestuffs with acid. Optionally, the crude products are purified by dissolving and crystallising without filtration.

A variation of the process for the production of the new bisformazan dyestuffs consists in condensing an aminoformazan dyestuff of the general formula II with a reactive compound introducing the radical Y of a bifunctional acid, or advantageously with a heterocyclic compound having at least two reactive substituents, and reacting the obtained monocondensation product with a further aminoformazan dyestuff of the formula II, which differs from the first aminoformazan dyestuff, to give a bisformazan dyestuff of the general formula I, and, if Y contains further reactive substituents, reacting these with ammonia or with a primary or secondary amine, or with a hydroxy or mercapto compound, and thereby so choosing the starting materials that the obtained bisformazan dyestuffs of the formula I contain 2 to 6 groups Z. This process is particularly suitable for the production of unsymmetrical bisformazan dyestuffs, according to the invention.

The reaction conditions and the subsequent precipitation of the bisformazan dyestuffs thereby correspond to those mentioned for the first process.

The new bisformazan dyestuffs are obtained depending on the procedure used, as homogeneous products or as mixtures thereof.

The new heavy-metal-containing bisformazan dyestuffs of the formula I, obtainable according to the invention, are characterised by a high colouring strength and substantivity, i.e. by a good affinity to cellulose fibres. They are therefore suitable for the dyeing or printing of various materials using the normal dyeing or printing methods for substantive dyestuffs, particularly for the dyeing or printing of fibres made from natural and regenerated cellulose aus as bast fibres, e.g. linen, hemp, jute, ramie; leaf fibres, e.g. sisal, Manila hemp, yucca; fruit fibres, e.g. coco, or especially seed fibres, e.g. cotton, and also staple fibres using the pad-dyeing process or, in particular, the exhaust process, whereby these fibres are dyed in reddish to greenish blue shades. The obtained dyeings or printings are thereby characterised by a pure shade of colour and by good fastness properties, having, in particular, a remarkable fastness to light and wet processing.

If dyeing is performed using the exhaust process, then the material to be dyed is introduced into the dye bath with a long liquor that means a ratio of goods to liquor of about 1:50, and at a temperature of ca. 40° to 50° C., the temperature of the dye bath is slowly raised to 100° C. and the dyeing process is completed at this temperature during 45 to 60 minutes. The neutral salts for accelerating the extraction of the dyestuff, such as sodium sulphate, can be added to the bath before or, optionally, after the attainment of the actual dyeing temperature.

In order to increase the rate of dyeing and to improve evenness and dye-penetration, particularly in dyeing mixed fabrics made from polyester and cotton, the dyeings are occasionally dyed by the high-temperature process at a temperature of 130° C. Since certain bisformazan dyestuffs at these elevated temperatures in closed systems are susceptible to decomposition through boiling, an addition of potassium bichromate or ammonium sulphate (1–2 g/l) to the dye bath is advisable.

With the pad-dyeing process, which is used almost exclusively in piece-dyeing, the material is impregnated with the dyestuff solution. Impregnation can be thereby performed once or repeatedly. The dyestuff is afterwards fixed by introducing the impregnated material into appropriate fixing baths or by a moist or dry heat treatment, or by using the cold storage method.

In order to improve the fastness properties, especially fastness to wet processing, the dyeings are advantageously given an aftertreatment with polyquaternary ammonium compounds.

For the printing of cellulose materials, a printing paste is advantageously used consisting of, e.g. the dyestuff, a thickener such as sodium alginate, thiodiethylene glycol, m-nitrobenzene sulphonic acid sodium, urea and triethylanolamine, whereby the printed material is afterwards steamed, rinsed and, optionally saponified.

A further advantage of the dyeings is that the colour shade and fastness to light of the cellulose dyeings obtained with the new dyestuffs, are not appreciably affected by the subsequent treatment with the agents for improving fastness to wet processing and/or creasing.

The following non-limitative examples illustrate the invention. The temperatures are given therein in degrees Centigrade.

EXAMPLE 1 hydrazino-5-acetylaminobenzoic acid with benzaldehyde, coupling with the diazo compound of 2-aminophenyl-4,6-disulphonic acid, complex formation with copper sulphate and subsequent saponification of the acetylamino group to the amino group, and dissolved in 1200 ml of water, is added dropwise at 40° within 60 minutes, while stirring, a solution of 10.1 g of isophthalic acid dichloride in 100 ml of acetone. The pH-value of the reaction mixture is maintained continually at ca. 7.0 to 7.5 by the simultaneous dropwise addition of an aqueous 10% sodium carbonate solution. Stirring is continued for ca. 60 minutes at this temperature until the reaction is completed and to the reaction mixture are then added 35 g of solid sodium chloride. The bisformazan dyestuff is filtered off and washed with dilute sodium chloride solution. The dyestuff of the above formula, dried in vacuo at 60°–70°, is in theform of a dark powder which dissolves in water to give a blue colour. The pure blue dyeings on cellulose fibres are fast to wet processing and very fast to light and they are well suited for the textile crease-proof finish.

Dyestuffs having similarly good properties are obtained by using, instead of the 100 ml of acetone, the same amounts of monochlorobenzene, trichlorobenzene or tetrachloroethane an distilling off the organic solvent with steam after completion of the reaction, the procedure being otherwise as described in this example.

The sodium salt of the aminoformazan compound—used in this example as starting compound—can also be obtained by suspending 29.7 g of the arylhydrazone (obtained by condensation of 2-hydrazino-5-acetylaminobenzoic acid with benzaldehyde) in 300 ml of water at 60°, adjusting the pH-value of the suspension to 7.5 with dilute sodium hydroxide solution, cooling the suspension to 30° by the addition of ice, and while stirring, adding to the suspension 40 g of sodium acetate and 25.0 g of crystallised copper sulphate. The aqueous diazonium suspension—obtained by diazotisation of 26.9 g of 2-aminophenol-4,6-disulphonic acid—is added dropwise at 20°–25°, while stirring, within 30 minutes. After the coupling is finished, the copper-complex of the formazan compound is precipitated by means of hydrochloric acid and sodium chloride, filtered off and washed with dilute sodium chloride solution. The moist filter residue is dissolved in 600 ml of aqueous sodium hydroxide solution. To this solution are then added, within 10 minutes, 35 g of a 15% aqueous sodium hydroxide solution, followed by 70 ml of ethylcellosolve. The reaction mixture is then stirred during 10 hours at 95°–98°, the sodium salt of the formed aminoformazan

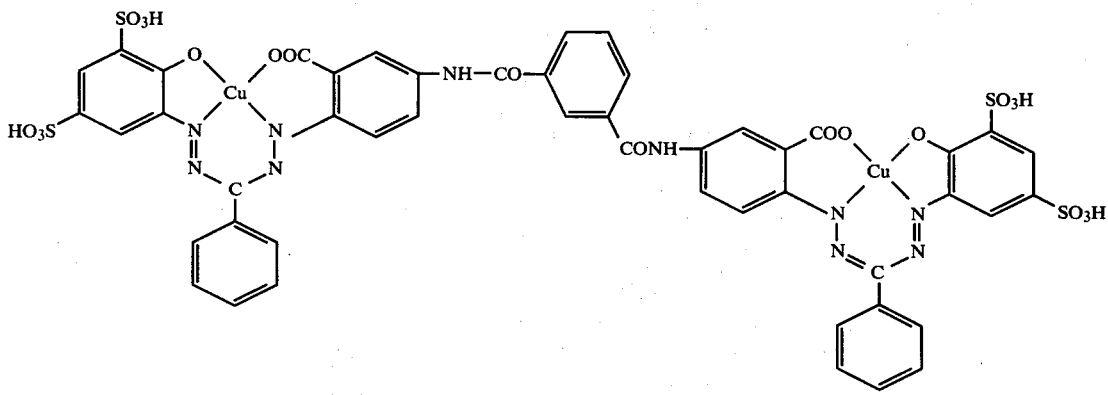

To 64.0 g of sodium salt of the aminoformazan compound which is produced by condensation of 2- dyestuff precipitated by means of sodium chloride, filtered off and washed with dilute sodium chloride solution.

EXAMPLE 2

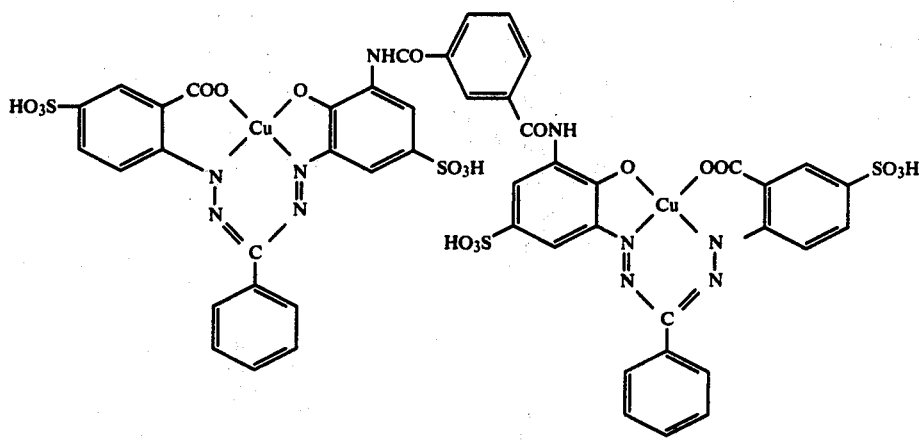

A solution of 10.1 g of isophthalic acid dichloride in 100 ml of acetone is added dropwise within 60 minutes at 40°–45°, while stirring, to 64.0 g of the sodium salt of the aminoformazan compound (obtained from 2-hydrazinobenzoic acid-5-sulphonic acid, benzaldehyde, copper sulphate and diazotised 6-acetylamino-2-aminophenol-4-sulphonic acid, with subsequent saponification of the acetylamino group to give the amino group) dissolved in 2000 ml of water. The pH-value of the reaction mixture is thereby maintained continually at 6.5–7.0 by the simultaneous dropwise addition of an aqueous 10% sodium carbonate solution. After no further free amino groups are detectable, a condition which is attained after ca. 60 minutes of further stirring, the bisformazan dyestuff is precipitated with sodium chloride, filtered, washed with dilute sodium chloride solution and dried in vacuo at 60°–70°. The dyestuff of the above composition is in the form of a dark powder, which dissolves in water to give a blue colour. The dyestuff produces on cellulose fibres, pure blue dyeings which are remarkably fast to light and to wet processing and which are not affected by application of a textile crease-proof finish.

Dyestuffs having similar properties are obtained if, instead of the aminoformazan dyestuff used in the described example, the equivalent amount of one the aminoformazan dyestuffs produced from the components in column II of the following Table I is used and condensed, according to the data given in this example, with the dichlorides listed in column III. The dyeings on cellulose fibre material, obtainable with the thus produced bisformazan dyestuffs, are characterised by the shade of colour given in column IV of the same table.

TABLE I

| I Example | II Aminoformazan dyestuff obtained from: | | | | III Dichloride | IV Dyeings on Cellulose |
|---|---|---|---|---|---|---|
| 3 | SO₃H, COOH, NHNH₂ (benzene) | CHO (benzene) | HO, NHCOCH₃, H₂N, SO₃H (benzene) | Cu | CHCOCl‖ClOCCH | greenish blue |
| 4 | " | " | " | " | ClOC—⟨⟩—COCl | blue |
| 5 | " | " | " | " | CH—⟨⟩—COCl ‖ CH—⟨⟩—COCl | greenish blue |
| 6 | COOH, NHNH₂ (benzene) | " | " | " | CHCOCl‖ClOCCH | blue |
| 7 | Cl, COOH, NHNH₂ (benzene) | CHO, SO₃H (benzene) | " | " | ⟨⟩—COCl, COCl | blue |
| 8 | HO₃S, COOH, NHNH₂ (benzene) | CHO (benzene) | SO₃H, HO, H₂N, NHCOCH₃ (benzene) | " | ⟨⟩—COCl, COCl | blue |

TABLE I-continued

| Example | II Aminoformazan dyestuff obtained from: | | | | III Dichloride | IV Dyeings on Cellulose |
|---|---|---|---|---|---|---|
| 9 | " | " | " | " | ClOC—C₆H₄—COCl | blue |
| 10 | 4-CH₃COHN-2-(NHNH₂)-benzoic acid (CH₃COHN, COOH, NHNH₂) | " | 2-hydroxy-3-amino-benzene-1,5-disulfonic acid (HO, H₂N, SO₃H, SO₃H) | " | ClOCCH=CHCOCl | greenish blue |
| 11 | " | " | 2-hydroxy-3-amino-5-carboxy-benzenesulfonic acid (HO, H₂N, COOH, SO₃H) | " | ClOC—C₆H₄—COCl | blue |
| 12 | " | " | 2-hydroxy-3-amino-5-ethylsulfonyl-benzenesulfonic acid (HO, H₂N, SO₃H, SO₂C₂H₅) | " | ClOC—C₆H₄—COCl (meta) | reddish blue |
| 13 | 4-SO₃H-2-(NHNH₂)-benzoic acid (SO₃H, COOH, NHNH₂) | naphthalene-1-carbaldehyde (CHO) | 2-hydroxy-3-amino-5-sulfo-6-acetamido-benzene (NHCOCH₃, HO, H₂N, SO₃H) | " | ClOCCOOH=CH | greenish blue |
| 14 | " | " | " | " | ClOC—C₆H₄—COCl (meta) | blue |
| 15 | CH₃COHN-COOH-NHNH₂ | 3-formyl-benzenesulfonic acid (CHO, SO₃H) | 2-hydroxy-4-methylsulfonyl-aniline (HO, H₂N, SO₂CH₃) | " | ClOCCH=CHCOCl | blue |
| 16 | " | " | " | " | ClOC—C₆H₄—COCl | blue |
| 17 | " | glyoxylic acid (CHO, COOH) | " | " | ClOCCH=CHCOCl | reddish blue |
| 18 | " | " | " | " | ClOC—C₆H₄—COCl (meta) | red-blue |
| 19 | HO₃S-COOH-NHNH₂ | benzaldehyde (CHO) | 2-carboxy-4-acetamido-aniline (COOH, NHCOCH₃, H₂N) | " | ClOCCH=CHCOCl | blue |
| 20 | NHCOCH₃-COOH-NHNH₂ | 3-formyl-benzenesulfonic acid (CHO, SO₃H) | 2-hydroxy-3-amino-5-methylsulfonyl-benzenesulfonic acid (HO, H₂N, SO₃H, SO₂CH₃) | " | ClOC—C₆H₄—COCl (meta) | reddish blue |
| 21 | " | " | " | " | ClOC—C₆H₄—COCl | blue |
| 22 | " | " | 2-hydroxy-5-sulfo-aniline (HO, H₂N, SO₃H) | " | ClOC—C₆H₄—COCl (meta) | reddish blue |
| 23 | " | " | " | " | ClOC—C₆H₄—COCl | reddish blue |
| 24 | " | " | " | " | ClOCCH=CHCOCl | greenish blue |
| 25 | " | 4-formyl-benzenesulfonic acid (CHO, SO₃H) | 2-hydroxy-3-amino-benzene-1,5-disulfonic acid (HO, H₂N, SO₃H, SO₃H) | " | ClOC—C₆H₄—COCl (meta) | reddish blue |
| 26 | " | 3-formyl-benzenesulfonic acid (CHO, SO₃H) | 2-hydroxy-3-amino-5-sulfamoyl-benzenesulfonic acid (HO, H₂N, SO₃H, SO₂NH₂) | " | ClOC—C(CH₃)=CH—COCl | blue |

TABLE I-continued

| I Example | II Aminoformazan dyestuff obtained from: | | | | III Dichloride | IV Dyeings on Cellulose |
|---|---|---|---|---|---|---|
| 27 | " | " | HO—C₆H₂(SO₃H)(Cl)—NH₂ (2-amino-4-chloro-6-sulfo phenol) | " | CH=CH bridged bis(benzoyl chloride) | greenish blue |
| 28 | CH₃—C₆H₃(COOH)—NHNH₂ | " | HO—C₆H₂(NHCOCH₃)(SO₃H)—NH₂ | " | 2,6-naphthalenedicarbonyl dichloride (ClOC—naphth—COCl) | greenish blue |
| 29 | SO₃H—C₆H₃(COOH)—NHNH₂ | CHO—C₆H₄—NH₂ (3-aminobenzaldehyde) | HO—C₆H₃(SO₃H)—NH₂ | " | ClOC—C₆H₄—COCl (terephthaloyl chloride) | blue |
| 30 | " | " | " | " | ClOC—C₆H₄—COCl (isophthaloyl chloride) | reddish blue |
| 31 | " | " | " | " | CH(COCl)=C(CH₃)—COCl | greenish blue |
| 32 | NHCOCH₃—C₆H₃(COOH)—NHNH₂ | CHO—C₆H₄—SO₃H | " | " | CHCOCl=CHCOCl | greenish blue |
| 33 | " | CHO—C₆H₅ (benzaldehyde) | HO—C₆H₂(SO₃H)₂—NH₂ | " | ClOC—C₆H₄—N=N—C₆H₄—COCl | greenish blue |
| 34 | " | " | " | " | 2,6-naphthalenedicarbonyl dichloride | greenish blue |
| 35 | " | " | NH₂—naphthalene(OH)(SO₃H) (1-amino-2-hydroxy-naphthalene-4-sulfonic acid) | " | CH(COCl)=CH(COCl) | greenish blue |
| 36 | " | " | HO—C₆H₂(SO₃H)₂—NH₂ | " | bis(4-carbamoyl chloride aminophenyl) (NH—COCl)₂—C₆H₄—C₆H₄ | blue |
| 37 | HO₃S—C₆H₃(COOH)—NHNH₂ | " | HO—C₆H₂(NHCOCH₃)(SO₃H)—NH₂ | Ni | ClOC—C₆H₄—COCl (isophthaloyl) | dull bordeaux |
| 38 | NHCOCH₃—C₆H₃(COOH)—NHNH₂ | CHO—C₆H₃(Cl)(SO₃H) | HO—C₆H₂(SO₃H)₂—NH₂ | Cu | CH(COCl)=CH(COCl) | greenish blue |
| 39 | HO₃S—C₆H₃(COOH)—NHNH₂ | benzodiazepine-CHO derivative | HO—C₆H₂(NHCOCH₃)(SO₃H)—NH₂ | " | ClOC—C₆H₄—COCl | reddish blue |
| 40 | SO₂NH₂—C₆H₃(COOH)—NHNH₂ | CHO—C₆H₄—SO₃H | " | " | " | blue |
| 41 | SO₂NHCH₃—C₆H₃(COOH)—NHNH₂ | " | " | " | ClOC—C₆H₄—COCl | blue |

TABLE I-continued

| I Example | II Aminoformazan dyestuff obtained from: | | | III Dichloride | IV Dyeings on Cellulose |
|---|---|---|---|---|---|
| 42 | SO₂CH₃–C₆H₃(COOH)(NHNH₂) | " | " | CH–COCl ‖ ClOC–CH | greenish blue |
| 43 | Cl–C₆H₃(COOH)(NHNH₂) | " | " | " | " |
| 44 | SO₂NH₂–C₆H₃(COOH)(NHNH₂) | " | HO–C₆H₂(SO₃H)(NH₂)(NHCOCH₃) | ClOC–C₆H₄–COCl | blue |
| 45 | SO₂N(CH₃)₂–C₆H₃(COOH)(NHNH₂) | " | HO–C₆H₂(NHCOCH₃)(NH₂)(SO₃H) | " | " |
| 46 | COCH₃–NH–C₆H₃(COOH)(NHNH₂) | " | HO–C₆H₂(Cl)(NH₂)(SO₃H) | " | " |
| 47 | " | " | HO–C₆H₂(SO₃H)(NH₂)(Cl) | CH–COCl ‖ ClOC–CH | greenish blue |
| 48 | C₁₀H₆(COOH)(NHNH₂) (naphthalene) | " | HO–C₆H₂(NHCOCH₃)(NH₂)(SO₃H) | ClOC–C₆H₄–COCl | blue |
| 49 | NHCOCH₃–C₆H₃(COOH)(NHNH₂) | " | HO–C₆H₃(NH₂)(Cl) | " | " |
| 50 | " | " | HO–C₆H₄–NH₂ | CH–COCl ‖ ClOC–CH | greenish blue |
| 51 | " | " | HO–C₆H₃(NH₂)(SO₂CH₃) | ClOC–C₆H₄–COCl | blue |
| 52 | " | " | HO–C₆H₃(NH₂)(COOH) | C₆H₄(COCl)₂ (meta) | " |
| 53 | " | " | HO–C₆H₃(NH₂)(SO₂NH₂) | CH–COCl ‖ ClOC–CH | greenish blue |
| 54 | " | " | HO–C₆H₂(Cl)(NH₂)(Cl) | " | " |
| 55 | " | " | HO–C₆H₂(NH₂)(Cl)(Cl) | " | " |
| 56 | H₃C–C₆H₃(COOH)(NHNH₂) | " | HO–C₆H₂(NHCOCH₃)(NH₂)(SO₃H) | ClOC–C₆H₄–COCl | " |
| 57 | CH₃O–C₆H₃(COOH)(NHNH₂) | " | " | " | " |

EXAMPLE 58
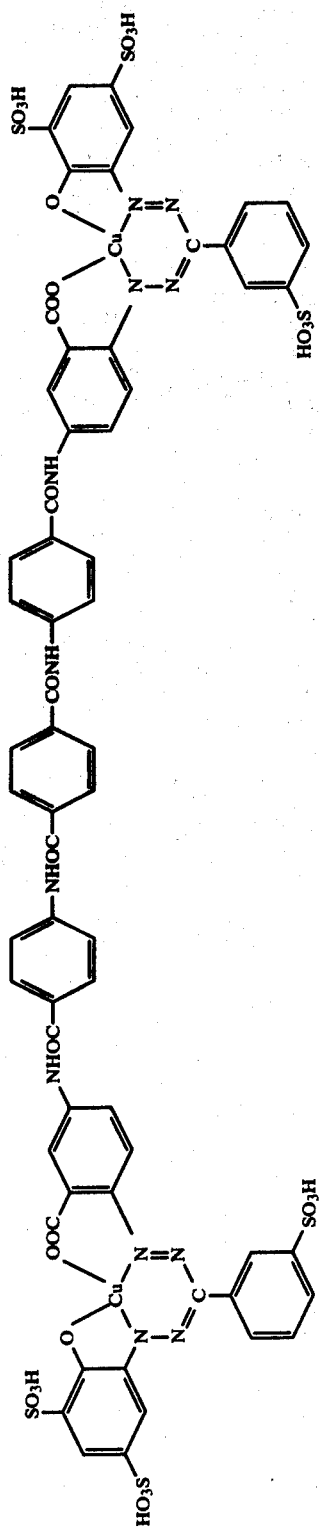

A solution of 22.3 g of p-nitrobenzoyl chloride in 100 ml of acetone is added dropwise at 40°–45° within 120 minutes to 74.2 g of the sodium salt of the aminoformazan compound (obtained from 2-hydrazino-5-acetylaminobenzoic acid, benzaldehyde-3-sulphonic acid, copper sulphate and 2-aminophenol-4,6-disulphonic acid, with subsequent saponification of the acetylamino group to the amino group) dissolved in 800 ml of water. The pH-value of the reaction mixture is maintained at 7.0 to 7.5 by the simultaneous dropwise addition of an aqueous 10% sodium carbonate solution. Stirring of the reaction mixture proceeds for ca. 10 hours at 40°–45° until no further free amino groups are detectable. The reaction mixture is cooled and the p-nitrobenzoylamino-formazan dyestuff salted out by the addition of 180 g of solid sodium chloride, filtered off and washed with dilute sodium chloride solution.

The p-nitrobenzoylamino-formazan dyestuff is then suspended in 700 ml of warm water at 40° and adjusted to a pH-value of 11.0 with an aqueous 30% sodium hydroxide solution. 112 ml of an aqueous 20% sodium sulphide solution is then added dropwise, while stirring, within 60 minutes, the suspension filtered and to the filtrate are added, within 30 minutes at 20°, 25 g of crystallised copper sulphate, dissolved in 100 ml of water. A pH-value of 2.0 is then obtained with 18% hydrochloric acid, the dyestuff is precipitated with sodium chloride, potassium chloride and dimethylformamide, filtered off and the precipitate washed with a dilute solution of sodium chloride, potassium chloride and dimethylformamide. The p-aminobenzoylaminoformazan compound is thereupon dissolved in 600 ml of warm water at 40°–45° and the pH-value of the solution adjusted to 7.5 by addition of an aqueous sodium hydroxide solution. To this solution are added dropwise, within 45 minutes, 4.8 g of terephthalic acid dichloride, dissolved in 100 ml of acetone, and the pH-value of the reaction mixture is continually maintained at 7.0–7.5 by the simultaneous dropwise addition of an aqueous 10% sodium carbonate solution. After no further free amino groups can be detected, the formed bisformazan dyestuff is salted out with sodium chloride, filtered off and washed with dilute sodium chloride solution. After drying in vacuo at 60°–70°, a dark dyestuff is obtained of the above composition which dissolves in water with a blue colour. Applied to cellulose fibres, this dyestuff produces a reddish blue dyeing having fastness to wet processing and exceptional fastness to light, and which is not impaired by application of a crease-proof finish.

Dyestuffs having similar properties are obtained if according to the procedure of this example the equivalent amounts of one of the m- or p-aminobenzoylaminoformazan dyestuffs produced from the components in column II of the following table II are condensed with the dichlorides listed in column III. The dyeings on cellulose fibre material produced with the obtained bisformazan dyestuffs, are given in column IV of the same table.

TABLE II

| I Ex. No. | II m- or p-Aminobenzoylaminoformazan dyestuff obtained from: | | | | III DSi-chloride | IV Dyeings on Cellulose |
|---|---|---|---|---|---|---|
| 59 | NHCOCH₃, COOH, NHNH₂ (benzene) | CHO—C₆H₄—SO₃H | HO, H₂N, SO₃H, SO₃H (benzene) | CO | NO₂—C₆H₄—COCl | ClOC—⌬—COCl | reddish blue |
| 60 | '' | '' | '' | '' | '' | ⌬(COCl)(COCl) | '' |
| 61 | '' | '' | '' | '' | '' | CH—COCl ‖ ClOC—C—Cl | blue |
| 62 | '' | CHO—C₆H₅ | '' | '' | '' | ClOC—⌬—COCl | '' |
| 63 | '' | '' | '' | '' | '' | ⌬(COCl)(COCl) | '' |
| 64 | '' | '' | '' | '' | '' | CH—COCl ‖ ClOC—CH | '' |
| 65 | '' | CHO—C₆H₅ | '' | '' | '' | CH—COCl ‖ ClOC—C—Cl | '' |
| 66 | '' | CHO—C₆H₄—SO₃H | '' | '' | COCl—⌬—NO₂ | ClOC—⌬—COCl | reddish blue |
| 67 | '' | CHO—C₆H₅ | '' | '' | '' | ⌬(COCl)(COCl) | '' |

TABLE II-continued

| I | II | | | | | III | IV |
|---|---|---|---|---|---|---|---|
| Ex. No. | m- or p-Aminobenzoylaminoformazan dyestuff obtained from: | | | | | DSi-chloride | Dyeings on Cellulose |
| 68 | " | " | " | " | " | 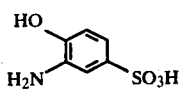 CH—COCl ‖ ClOC—C—Cl | blue |
| 69 | " | " | 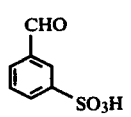 HO—C₆H₃(H₂N)(SO₃H) | " | " | CH—COCl ‖ ClOC—CH | " |
| 70 | " | 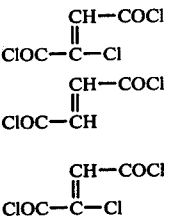 CHO—C₆H₄—SO₃H | " | " | " | CH—COCl ‖ ClOC—C—Cl | " |

EXAMPLE 71

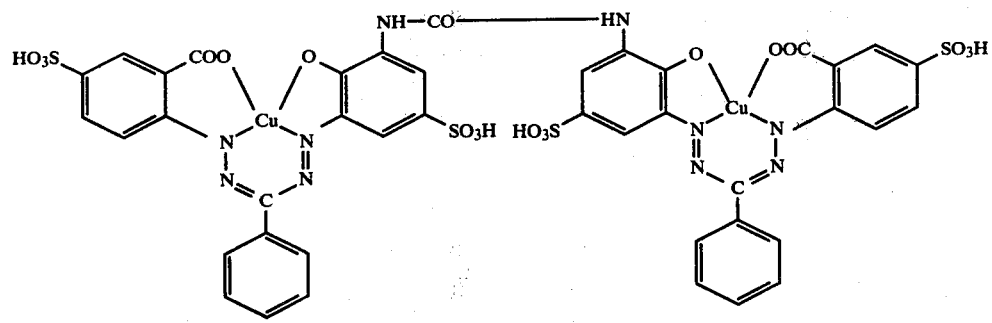

Into a solution at 60° of 64.0 g of the sodium salt of the aminoformazan compound (obtained according to example 2) dissolved in 2000 ml of water, phosgene is introduced until no further free amino groups are detectable in the reaction mixture. By the simultaneous dropwise addition of an aqueous 10% sodium carbonate solution, the pH-value of the reaction mixture is continuously maintained at 6.5 to 7.0. After the introduction of phosgene has ceased, stirring continues for a further ca. 30 minutes and the finished bisformazan dyestuff is precipitated with sodium chloride, filtered off, washed with sodium chloride solution and dried in vacuo at 60°–70°. The dyestuff of the above composition is in the form of a dark powder which dissolves in water with a blue colour. The dyestuff dyes cellulose fibres in pure blue shades having remarkable fastness to light. The dyeings have fastness to wet processing and are suitable for the application of the crease-proof finish.

Dyestuffs having similar properties are obtained by using, instead of the aminoformazan dyestuff mentioned in this example, the equivalent amount of one of the aminoformazan dyestuffs produced from the components in column II of the following table III optionally by saponification of the acetylamino group and condensing with phosgene according to the data given in this example. The shades of the dyeings produced with the obtained bisformazan dyestuffs on cellulose fibre material are listed in column III of the same table.

TABLE III

| I | II | | | | III |
|---|---|---|---|---|---|
| Ex. No. | Aminoformazan dyestuff obtained from: | | | | Dyeings on Cellulose |
| 72 | 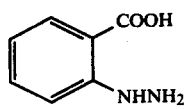 COOH, NHNH₂ | 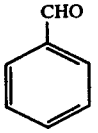 CHO | 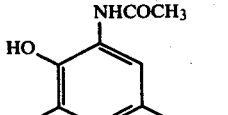 NHCOCH₃, HO, H₂N, SO₃H | Cu | reddish blue |
| 73 | 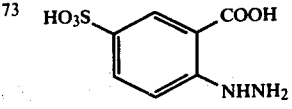 HO₃S, COOH, NHNH₂ | " | 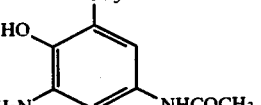 SO₃H, HO, H₂N, NHCOCH₃ | " | greenish blue |
| 74 | 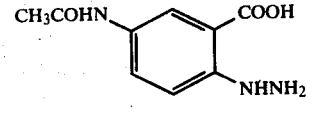 CH₃COHN, COOH, NHNH₂ | " | 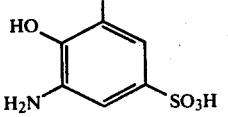 SO₃H, HO, H₂N, SO₃H | " | blue |

TABLE III-continued

| Ex. No. | Aminoformazan dyestuff obtained from: | | | | Dyeings on Cellulose |
|---|---|---|---|---|---|
| 75 | HO₃S–C₆H₃(COOH)(NHNH₂) | 1-naphthaldehyde (CHO) | HO–C₆H₂(NHCOCH₃)(NH₂)(SO₃H) | " | reddish blue |
| 76 | C₆H₄(COOH)(NHNH₂) | salicylaldehyde (2-HO-C₆H₄-CHO) | " | " | reddish blue |
| 77 | CH₃COHN–C₆H₃(COOH)(NHNH₂) | glyoxylic acid (OHC-COOH) | HO–C₆H₃(NH₂)(SO₃H) | " | reddish blue |
| 78 | HO₃S–C₆H₃(COOH)(NHNH₂) | benzaldehyde (C₆H₅-CHO) | HOOC–C₆H₂(NHCOCH₃)(NH₂) | " | blue |
| 79 | HO–C₆H₃(SO₃H)(NHNH₂) | benzaldehyde | HO–C₆H₂(NHCOCH₃)(NH₂)(SO₃H) | " | grey-blue |
| 80 | NHCOCH₃–C₆H₃(COOH)(NHNH₂) | 3-sulfobenzaldehyde | HO–C₆H₂(SO₃H)(NH₂)(SO₂CH₃) | " | blue |
| 81 | HO₃S–C₆H₃(COOH)(NHNH₂) | 4-aminobenzaldehyde | HO–C₆H₃(NH₂)(SO₃H) | Cu | blue |
| 82 | CH₃CONH–C₆H₃(COOH)(NHNH₂) | glyoxylic acid (OHC-COOH) | HO–C₆H₂(SO₃H)(NH₂)(SO₂CH₃) | " | " |
| 83 | naphthalene-3-COOH-2-NHNH₂ | salicylaldehyde | HO–C₆H₂(NHCOCH₃)(NH₂)(SO₃H) | " | " |

Further dyestuffs having similar properties are also obtained by using, instead of the p-aminobenzoylaminoformazan dyestuff mentioned in example 58, the equivalent amount of one of the m- or p-nitrobenzoylaminoformazan dyestuffs produced from the components in column II of the following table IV and according to the data given in this example 58, reducing the nitro group to the amino group and introducing phosgene into the aqueous solutions of the thus obtained m- or p-aminobenzoylaminoformazan dyestuffs, with a pH-value of 6.5–7.0, until no further free amino groups are detectable. The shades of the dyeings produced with the obtained formazan dyestuffs on cellulose material are listed in column III of the same table.

TABLE IV

| Ex. No. | m- or p-Aminobenzoylaminoformazan dyestuff obtained from: | | | | | Dyeings on cellulose |
|---|---|---|---|---|---|---|
| 84 | 2-hydrazino-5-sulfobenzoic acid (SO₃H, COOH, NHNH₂) | benzaldehyde (CHO) | 2-amino-4-acetylamino-phenol-6-sulfonic acid (HO, HNCOCH₃, H₂N, SO₃H) | Cu | 4-nitrobenzoyl chloride (COCl, NO₂) | reddish blue |
| 85 | 2-hydrazino-5-acetylaminobenzoic acid (HNCOCH₃, COOH, NHNH₂) | 4-sulfobenzaldehyde (CHO, SO₃H) | 2-amino-phenol-4,6-disulfonic acid (HO, SO₃H, H₂N, SO₃H) | " | " | blue |
| 86 | 2-hydrazino-5-acetylaminobenzoic acid (HNCOCH₃, COOH, NHNH₂) | benzaldehyde (CHO) | 2-amino-phenol-4,6-disulfonic acid (HO, SO₃H, H₂N, SO₃H) | " | " | blue |
| 87 | " | " | " | " | 3-nitrobenzoyl chloride (COCl, NO₂) | blue |

EXAMPLE 88

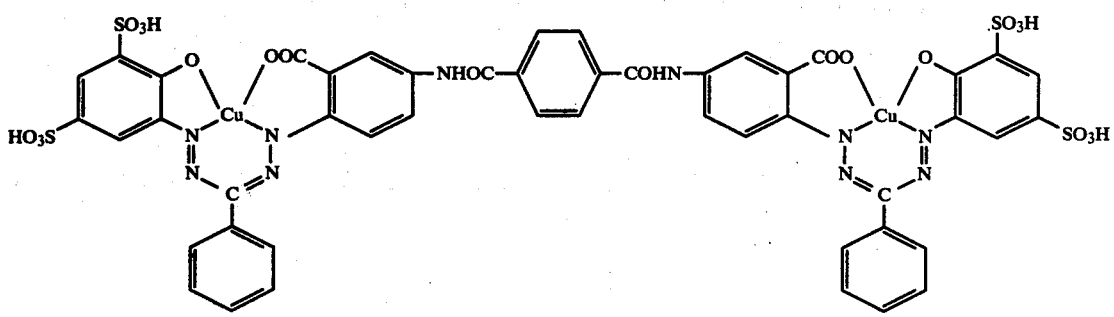

A solution of 10.1 g of terephthalic acid dichloride in 100 ml of acetone is added dropwise at 40° within 60 minutes to 64.0 g of the sodium salt of the aminoformazan compound (obtained from 2-hydrazino-5-acetylaminobenzoic acid, benzaldehyde, copper sulphate and diazotised 2-aminophenol-4,6-disulphonic acid, with subsequent saponification of the acetylamino group to the amino group) dissolved in 1200 ml of water. The pH-value of the reaction mixture is maintained at 7.0–7.5 by the simultaneous dropwise addition of an aqueous 10% sodium carbonate solution. After no further free amino groups can be detected, which is the case after ca. 60 minutes of further stirring, 35 g to 50 g of solid sodium chloride are added, the formed bisformazan dyestuff is filtered off and subsequently washed with dilute sodium chloride solution. The dyestuff of the above composition, dried in vacuo at 60°–70°, is in the form of a dark powder which dissolves in water with a blue colour. The pure blue dyeings on cellulose fibres have fastness to wet processing and a remarkable fastness to light and are well suited for application of the crease-proof finish.

A dyestuff having similar properties is obtained if, instead of the solution of 10.1 g of terephthalic acid dichloride in 100 ml of acetone, the same amounts of solid terephthalic acid dichloride are sprinkled into the aqueous solution—at 60°—of the aminoformazan dyestuff, proceeding otherwise as described in this example 88.

EXAMPLE 89

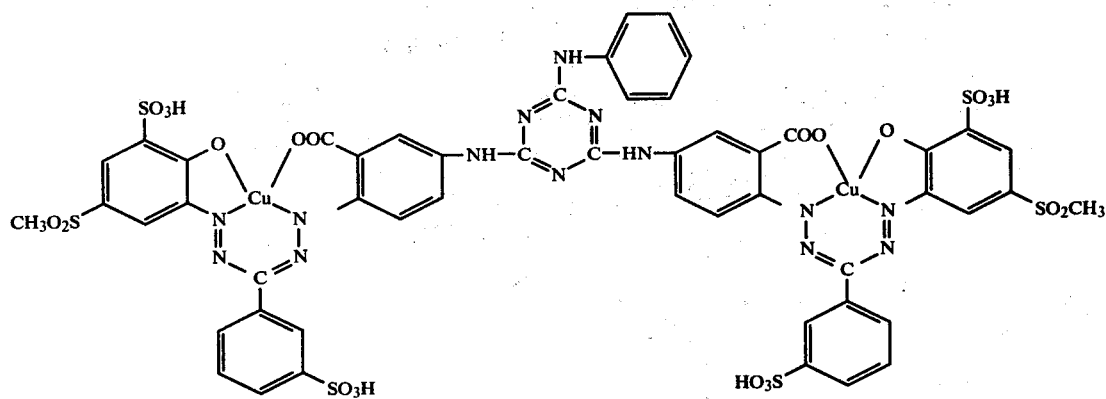

An aqueous suspension of cyanuric chloride (obtained by the dropwise application of a solution of 8.0 g of cyanuric chloride in 80 ml of acetone on to a mixture of ice and water) is added dropwise at 0°–5° and within 30 minutes to 35.9 g of the sodium salt of the aminoformazan compound (obtained from 2-hydrazino-5-acetylaminobenzoic acid, benzaldehyde-3-sulphonic acid, copper sulphate and diazotised 2-aminophenol-4-methyl-sulphone-6-sulphonic acid, with subsequent saponification of the acetylamino group to the amino group) dissolved in 500 ml of water. The pH-value is maintained at 6.5–7.0 by the simultaneous dropwise addition of an aqueous 10% sodium carbonate solution. If the test for primary amino groups is negative, which is the case after ca. 60 minutes further stirring, then a further 35.9 g of the same aminoformazan compound are added dropwise within 30 minutes, the reaction mixture is heated to 40° and the solution stirred at this temperature until no further free amino groups are detectable. The pH-value is thereby continually maintained at 6.5–7.0. The formed bisformazan compound is precipitated by addition of sodium chloride, filtered off and washed with dilute sodium chloride solution. The moist product is then dissolved in 800 ml of water at ca. 80° with a pH-value of 7.5, 4.2 g of aniline are added and stirring is continued at this temperature (with the pH-value held constant at 7.0–7.5 by addition of an aqueous 10% sodium carbonate solution) until the dyestuff shows no further change. The formed dyestuff is precipitated with sodium chloride, filtered off, washed with dilute sodium chloride solution and dried at 70° in vacuo. The dyestuff of the above composition is in the form of a dark powder which dissolves in water with a blue colour. With this dyestuff are obtained on cellulose fibres, blue dyeings having fastness to wet processing and, in particular, fastness to light, being also well suited for application of the crease-proof finish.

Dyestuffs having similar properties are obtained by using aminoformazan dyestuffs, produced from the components listed in column II of the table V, the procedure being analogous with condensation with cyanuric chloride, and subsequently reacting the free chlorine atom in the cyanuric chloride with the amines listed in column III. The shade of the dyeings of these bisformazan dyestuffs on cellulose fibres is given in column IV.

TABLE V

| I Ex. No. | II Aminoformazan dyestuff obtained from (afterwards condensed with cyanuric acid) | | | | III Amine | IV Dyeings on Cellulose |
|---|---|---|---|---|---|---|
| 90 | HO₃S–C₆H₃(COCH)(NHNH₂) | CHO–C₆H₅ | HO–C₆H₂(NHCOCH₃)(H₂N)(SO₃H) | Cu | H₂N–C₆H₄–SO₃H | reddish blue |
| 91 | " | " | " | " | H₂N–naphthalene–(SO₃H)₂ | blue |
| 92 | CH₃COHN–C₆H₃(COCH)(NHNH₂) | " | HO–C₆H₂(SO₃H)(H₂N)(SO₃H) | " | H₂N–C₆H₅ | blue |
| 93 | " | " | " | " | H₂N–C₆H₃(OH)(COOH) | blue |
| 94 | " | " | " | " | NH₃ | blue |
| 95 | " | " | " | " | H₂N–C₆H₄–SO₃H | blue |

TABLE V-continued

| I Ex. No. | II Aminoformazan dyestuff obtained from (afterwards condensed with cyanuric acid) | | | | III Amine | IV Dyeings on Cellulose |
|---|---|---|---|---|---|---|
| 96 | " | " | " | " | H₂NC₂H₄SO₃H | blue |
| 97 | " | " | " | " | CH₃NH₂ | blue |
| 98 | " | " | " | " | CH₃NHCH₂COOH | blue |
| 99 | " | " | " | " | CH₃CONH—⌬—⌬—NH₂ | blue |
| 100 | CH₃COHN-⌬(COOH)(NHNH₂) | CHO-⌬-SO₃H | HO, SO₃H / H₂N, SO₂CH₃ (benzene) | Cu | H₂N—⌬ | blue |
| 101 | HO₃S-⌬(COOH)(NHNH₂) | CHO-⌬ | HO, NHCOCH₃ / H₂N, SO₃H (benzene) | " | " | reddish blue |
| 102 | " | " | " | " | H₂N—⌬(OH)(COOH) | reddish blue |

EXAMPLE 103

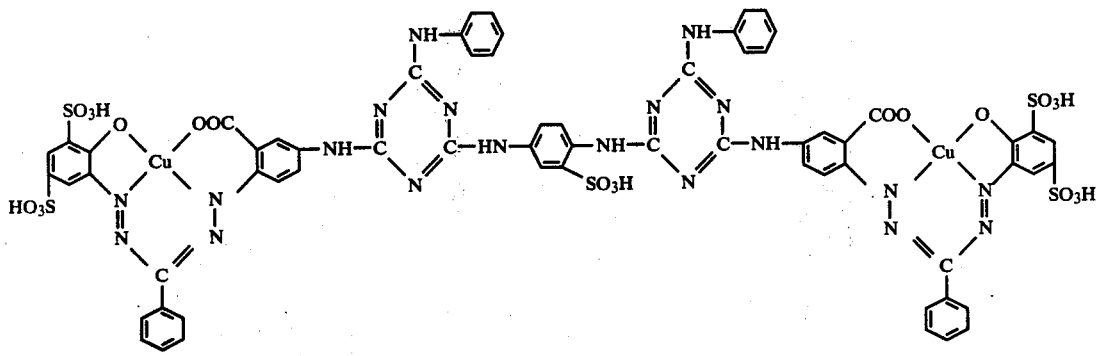

8.3 g of 1.4-diaminobenzene-2-sulphonic acid, as sodium salt, are dissolved in 120 ml of water at 40° and added dropwise within 30 minutes at 0°-5° to an aqueous suspension of cyanuric chloride (obtained by the dropwise addition, while vigorously stirring, of a solution of 18.4 g of cyanuric chloride in 180 ml of acetone to a mixture of ice and water), whereby the pH-value of 6.0-6.5 is maintained constant by adding dropwise an aqueous 10% sodium carbonate solution. As soon as no further free amino groups can be detected, 64.0 g of the aminoformazan dyestuff (used in example 1), dissolved in 1000 ml of water, are added dropwise within 30 minutes. The pH-value is kept constant at 6.5 to 7.0 by the dropwise addition of an aqueous 10% sodium carbonate solution. The reaction solution is heated, while being stirred, to 40° and maintained at this temperature until the test for free amino groups is negative. After the solution has been cooled to 10°-15°, the formed bisformazan compound is precipitated with sodium chloride as well as with dimethylformamide and ethyl alcohol, filtered off and washed with a solution of sodium chloride, ethyl alcohol and dimethylformamide. The moist filtrate is then suspended in 1000 ml of water, 8.4 g of aniline are added, the reaction mixture is heated to 80° and the pH-value is kept at 7.0-7.5 by the dropwise addition of an aqueous 10% sodium carbonate solution. The reaction solution is stirred until the dyestuff shows no further change. The dyestuff is then precipitated at 40°-45° with sodium chloride and dimethylformamide, filtered off and washed with an aqueous solution of sodium chloride and dimethyl formamide and dried in vacuo at 60°-70°. The dyestuff of the above composition is in the form of a dark powder, which dissolves in water with a blue colour. The green-blue dyeings on cellulose fibres have fastness to wet processing and light and are not impaired by application of the crease-proof finish.

If, instead of the aminoformazan dyestuff used in this example equivalent amounts of the aminoformazan dyestuffs obtained from the components listed in column II of the following table VI optionally saponifying the acetylamino group are used and instead of the condensation product obtained from 1,4-diaminobenzene-2-sulphonic acid and cyanuric chloride, corresponding amounts of the condensation products, given in column III are used, the procedure being otherwise as stated in the example and the third chloro atom of the cyanuric chloride is condensed with the amines listed in column IV, then bisformazan dyestuffs are obtained having similarly valuable properties. The shades of these bisformazan dyestuffs on cellulose fibres are listed in column V.

TABLE VI

| Ex. No. | I Aminoformazan dyestuff obtained from: | II | | III condensation product obtained from cyanuric chloride and | | IV Amine | V Dyeings on cellulose |
|---|---|---|---|---|---|---|---|
| 104 | 3-acetamido-6-carboxaldehyde-phenylhydrazine (COCH₃, HN, COCH, NHNH₂) | 3-sulfo-benzaldehyde (CHO, SO₃H) | 2-amino-4,6-disulfo-phenol (HO, SO₃H, H₂N, SO₃H) | Cu | 1,4-phenylenediamine (H₂N—⟨⟩—NH₂) | HN—(C₂H₅)₂ | blue |
| 105 | " | benzaldehyde (CHO) | " | " | " | H₂N—⟨⟩ | " |
| 106 | 5-sulfo-2-carboxy-phenylhydrazine (HO₃S, COOH, NHNH₂) | 3-amino-benzaldehyde (CHO, NH₂) | 2-amino-4-sulfo-phenol (HO, H₂N, SO₃H) | " | " | HN—(C₂H₅)₂ | reddish blue |
| 107 | " | " | 2-amino-4-methylsulfonyl-phenol (HO, H₂N, SO₂CH₃) | " | " | H₂N—⟨⟩ | " |
| 108 | " | benzaldehyde (CHO) | 3-acetamido-2-hydroxy-5-sulfo-aniline (HO, NHCOCH₃, H₂N, SO₃H) | " | 4,4'-diamino-2,2'-disulfo-stilbene (H₂N—⟨⟩—CH=CH—⟨⟩—NH₂, SO₃H, SO₃H) | " | " |
| 109 | " | " | " | " | " | H₂N—⟨⟩—SO₃H | " |
| 110 | " | " | " | " | " | CH₃NHCH₂COOH | " |
| 111 | " | " | " | " | " | HN—(C₂H₅)₂ | " |
| 112 | " | " | " | " | " | CH₃COHN—⟨⟩—⟨⟩—NH₂ | " |
| 113 | " | " | 3-amino-2-hydroxy-5-acetamido-benzenesulfonic acid (HO, SO₃H, H₂N, NHCOCH₃) | " | 1,3-diamino-4-sulfo-benzene (H₂N—⟨⟩—NH₂, SO₃H) | HN—(C₂H₅)₂ | " |
| 114 | " | " | " | " | " | CH₃COHN—⟨⟩—⟨⟩—NH₂ | grey-blue |
| 115 | 3-acetamido-6-carboxy-phenylhydrazine (COCH₃, HN, COOH, NHNH₂) | " | 2-amino-4,6-disulfo-phenol (HO, SO₃H, H₂N, SO₃H) | " | " | H₂N—⟨⟩ | greenish blue |
| 116 | " | " | " | " | " | HN—(C₂H₅)₂ | blue |
| 117 | " | " | " | " | H₂N—⟨⟩—NH₂ | H₂N—⟨⟩ | " |
| 118 | 5-sulfo-2-carboxy-phenylhydrazine (HO₃S, COOH, NHNH₂) | 3-amino-benzaldehyde (CHO, NH₂) | 2-amino-4-sulfo-phenol (HO, H₂N, SO₃H) | " | 1,4-diamino-2-sulfo-benzene (H₂N—⟨⟩—NH₂, SO₃H) | HN—(C₂H₅)₂ | reddish blue |

TABLE VI-continued

| Ex. No. | Aminoformazan dyestuff obtained from: | | | III condensation product obtained from cyanuric chloride and | IV Amine | V Dyeings on cellulose |
|---|---|---|---|---|---|---|
| 119 | " | " | HO—C₆H₃(NH₂)(SO₂CH₃) | " | " | " |
| 120 | COCH₃—NH—C₆H₃(COOH)(NHNH₂) | Cl—C₆H₃(CHO)(SO₃H) | HO—C₆H₂(SO₃H)(NH₂)(SO₃H) | " | H₂N—C₆H₅ | blue |
| 121 | " | C₆H₄(CHO)(SO₃H) | " | H₂N—biphenyl(SO₃H)—NH₂ | " | " |
| 122 | " | " | " | " | HN—(C₂H₅)₂ | " |
| 123 | " | C₆H₅CHO | " | " | " | " |
| 124 | " | " | " | " | H₂N—C₆H₅ | " |
| 125 | HO₃S—C₆H₃(COOH)(NHNH₂) | " | HO—C₆H₂(NHCOCH₃)(NH₂)(SO₃H) | " | " | reddish blue |
| 126 | " | " | " | " | H₂N—C₆H₄—SO₃H | " |
| 127 | COCH₃—NH—C₆H₃(COOH)(NHNH₂) | " | HO—C₆H₂(SO₃H)(NH₂)(SO₃H) | SO₃H—naphthalene(NH₂)(H₂N)(SO₃H) | HN—(C₂H₅)₂ | greenish blue |
| 128 | HO₃S—C₆H₃(COOH)(NHNH₂) | C₆H₄(CHO)(NH₂) | HO—C₆H₂(NH₂)(SO₂CH₃) | " | H₂N—C₆H₅ | reddish blue |
| 129 | " | " | " | " | HN—(C₂H₅)₂ | " |
| 130 | " | C₆H₅CHO | HO—C₆H₂(SO₃H)(NH₂)(NHCOCH₃) | " | H₂N—C₆H₅ | blue |
| 131 | COCH₃—NH—C₆H₃(COOH)(NHNH₂) | " | HO—C₆H₂(SO₃H)(NH₂)(SO₃H) | SO₃H—naphthalene(NH₂)(NH₂) | " | greenish blue |
| 132 | " | " | " | " | HN—(C₂H₅)₂ | " |
| 133 | " | " | " | " | CH₃COHN—biphenyl—NH₂ | " |

EXAMPLE 134

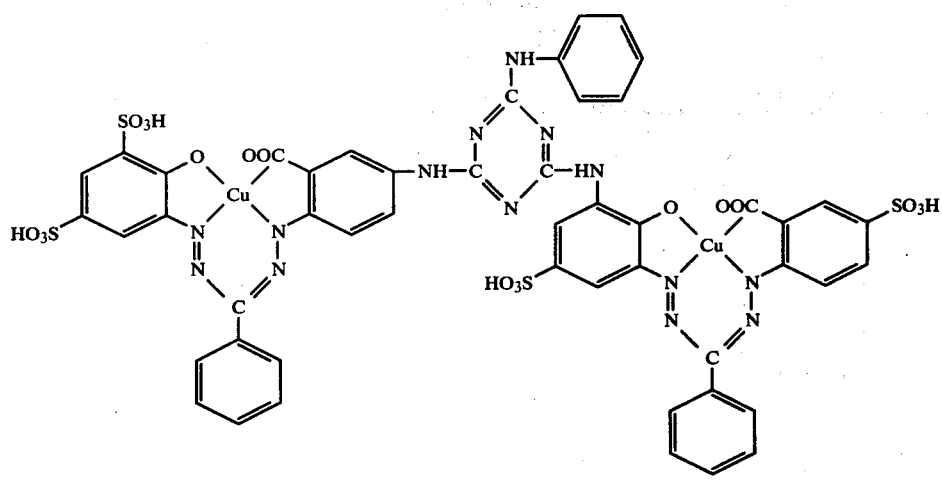

64.0 g of the aminoformazan compound, produced according to example 1, are dissolved (to give a neutral solution) at 90°, while being stirred, in 1200 ml of water. The solution is filtered hot to remove any by-products, and cooled to 40°. This solution is then added dropwise at 0°–5°, within 30 minutes, to an aqueous suspension of cyanuric chloride (obtained by pouring a solution of 18.4 g of cyanuric chloride in 180 ml of acetone on to a mixture of ice and water) and the whole is further stirred by the dropwise addition of an aqueous 10% sodium carbonate solution (maintaining a pH-value of 6.5–7.0) until no further free amino groups are detectable. 64.0 g of the neutral aqueous solution of the aminoformazan compound are then added dropwise, analogously to example 2, within 30 minutes and the temperature of the reaction mixture is raised to 40°. The pH-value is maintained at 6.5–7.5 by the dropwise addition of an aqueous 10% sodium carbonate solution. Stirring is continued at this temperature until no further free amino groups are are detectable. The unsymmetrical bisformazan dyestuff is then precipitated by addition of sodium chloride, filtered off and washed with dilute sodium chloride solution. The moist filtrate is then dissolved in 1500 ml of water at 80° (with a pH-value of 7.5) and to the solution are added, while being stirred, 8.4 g of aniline. The pH-value is maintained between 7.0 and 7.5 by the dropwise addition of an aqueous 10% sodium carbonate solution. Stirring proceeds at this temperature until no further change of the dyestuff is shown. The obtained dyestuff of the above composition is precipitated with sodium chloride, filtered off, washed with aqueous sodium chloride solution and dried in vacuo at 60°–70°. A dark powder is obtained which dissolves in water with a blue colour and which produces on cellulose fibres blue dyeings having fastness to wet processing and to light and which are suitable for the application of the crease-proof finish.

If, instead of cyanuric chloride, equimolecular amounts of the reactive compounds are used which are given in the following Table VII, the procedure being otherwise the same as in Example 134, then likewise are obtained unsymmetrical bisformazan dyestuffs having similarly good properties. If there still exists a free chlorine atom in the reactive compound after the condensation to the bisformazan dyestuff, the free chlorine atom is subsequently reacted with aniline as described in this example. The shades of the dyeings on cellulose fibres are given in column III.

TABLE VII

| I<br>Example No. | II<br>Reactive compound | III<br>Dyeings on cellulose |
|---|---|---|
| 135 | COCl-substituted dichloropyrimidine | blue |
| 136 | ClOC-substituted dichloropyrimidine | blue |
| 137 | ClOC-benzothiazole-Cl | blue |
| 138 | ClOC-benzoxazole-Cl | blue |
| 139 | ClOC-benzimidazole-Cl | blue |

EXAMPLE 140

A solution of 20.3 g of isophthalic acid dichloride in 300 ml of acetone is added dropwise at 40°–45° within 2 hours to 2500 ml of an aqueous solution of a mixture of 64.0 g of the sodium salt of the aminoformazan compound, corresponding to example 1, and 64.0 g of the sodium salt of the aminoformazan compound, corresponding to example 2. The pH-value of the reaction mixture is maintained between 7.0–7.5 by the dropwise addition of an aqueous 10% sodium carbonate solution. As soon as no further free amino groups can be detected, the mixture of the bisformazan dyestuffs is precipitated with sodium chloride, filtered off and washed with dilute sodium chloride solution. The dyestuff mixture, dried in vacuo at 60°–70°, is in the form of a dark powder which disolves in water with a blue colour. The reddish blue dyeings obtained therewith on cellulose fibres have fastness to wet processing and are very fast to light. They are also suitable for application of the crease-proof finish.

By introducing into the mixture of the aminoformazan compounds, instead of the solution of 20.3 g of isophthalic acid dichloride in 300 ml of acetone, as described in the example, phosgene gas until no further free amino groups are detectable, a dyestuff mixture is obtained which dyes cellulose fibres in blue shades having similar properties.

Dyestuff mixtures having similar properties are obtained by using, instead of isophthalic acid dichloride, equimolecular amounts of the acid chlorides given in Table VIII and proceding otherwise analogously to the procedure described in this example. The shades of the dyeings on cellulose fibres are given in column III.

TABLE VIII

| I Example | II Acid chloride | III Dyeings on cellulose |
|---|---|---|
| 141 | ClCO—⟨C₆H₄⟩—COCl | blue |
| 142 | CHCOCl ‖ ClOCCH | greenish blue |

EXAMPLE 143

In a dye bath, 6 g of the dyestuff, obtained according to example 2, are dissolved in 3000 ml of water containing 1 g of sodium carbonate. 100 g of cotton are introduced at 40°–50° into the dye liquor and the dye liquor is heated within 30 minutes to 90°–95°. 40 g of sodium sulphate are added twice in succession and the material is dyed during 60 minutes at the stated temperature. The dyed material is then rinsed cold and subsequently introduced into a dye liquor, consisting of 3000 ml of water and 1 g of a quaternated condensation product from pentamethyldiethylenetriamine and 2,2′-dichlorodiethyl ether, which was used in the form of a 35% aqueous solution, acidified with 0.5 ml of 40% acetic acid. The material is thereupon treated for 20 minutes in the bath at 30°, then removed and dried without intermediate rinsing.

A blue cotton dyeing is obtained having a good fastness to wet processing and excellent fastness to light.

If, instead of the 6 g of the dyestuff of example 2, 2 to 8 g of the dyestuffs according to example 1, or examples 3 to 142, are used and the material dyed as described in this example, cotton dyeings are obtained having similarly good properties.

EXAMPLE 144

A printing past is obtained by mixing together 35 g of the dyestuff, according to example 88, with 50 g of urea and 50 g of a solvent mixture, consisting of 5 parts of thiodiethylene glycol, 2 parts of benzyl alcohol and 3 parts of spirit, and dissolving the whole, while being stirred, in 250 ml of hot water.

Into this hot solution are added 10 g of the sodium salt of m-nitrobenzenesulphonic acid and 400 g of sodium alginate thickener 5% and stirring is continued until a homogeneous paste is obtained. This is allowed to cool and the total amount made up with water to 1000 g.

A cotton fabric is printed with this printing paste, the printing is dried and then steamed for 7 minutes at 102°–104°. The fabric is washed cold and subsequently treated for 5–10 minutes in a cold bath, containing 2 g of a condensation product from dicyanodiamide and ammonium chloride, urea and formaldehyde, as well as 0.5 ml of 80% acetic acid.

The material is thereupon dried without being rinsed.

A blue cotton printing is obtained having fastness to wet processing and very good fastness to light.

If, instead of the 35 g of the dyestuff according to example 88, 20–40 g of the dyestuffs according to examples 1 to 87, and according to examples 89 to 142 are used and the material dyed as described in the example, cotton printings are obtained having similarly good properties.

EXAMPLE 145

A cotton fabric is impregnated with a dyestuff solution (consisting of 30 g of dyestuff according to example 1, 1 g of alkylphenol-ethyleneoxide-condensation product and 940 ml of water) at 80°–85° on a two- or multi-roller padding-machine in a discontinuous or continuous manner. The impregnated cotton fabric is squeezed out and the dyestuff fixed with saturated steam at 103°–105° for 4 minutes. The material is rinsed warm and then cold, as usual, and dried. Pure blue dyed cotton fabric is obtained having very good fastness to light and good fastness to wet processing.

If the dyestuff is not fixed with saturated steam and the impregnated cotton fabric is treated for 20–30 minutes in a boiling salt bath, containing 20 g/l of calcined sodium sulphate, being then rinsed and dried in the usual manner, then likewise is obtained a pure blue dyed cotton fabric having the same good properties.

If, instead of the 30 g of the dyestuff according to example 1, 20–40 g of the dyestuffs, according to examples 2 to 142, are used, the material being dyed as described in this example, cotton dyeings are obtained having similarly good properties.

We claim:

1. A heavy-metal-containing bisformazan dyestuff of the formula

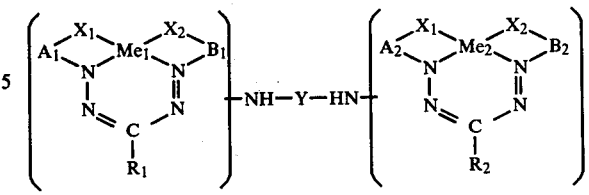

wherein
A₁ and A₂ represent (1) o-phenylene, (2) o-phenylene substituted by Z, halogen, lower alkyl, lower alkoxy, lower alkylsulphonyl, sulphamoyl, N-mono- or N,N-di-lower alkyl sulphamoyl, (3) o-naphthylene, or (4) o-naphthylene substituted by Z,
B₁ and B₂ represent (1) o-phenylene, (2) o-phenylene substituted by Z, halogen, lower alkylsulphonyl or sulphamoyl, (3) o-naphthylene, or (4) o-naphthylene substituted by Z, R$_1$ and R$_2$ represent (1) carboxy, (2) phenyl, (3) phenyl substituted by OH, halogen, or Z, (4) naphthyl, or (5)

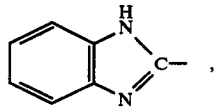

Me$_1$ and Me$_2$ each represent nickel or copper,
one of X$_1$ and X$_2$ represents —O— and the other represents —COO— said groups being connected to A$_1$, B$_1$, A$_2$ or B$_2$ in a position ortho to that to which the nitrogen is linked, Y represents a radical of the formula

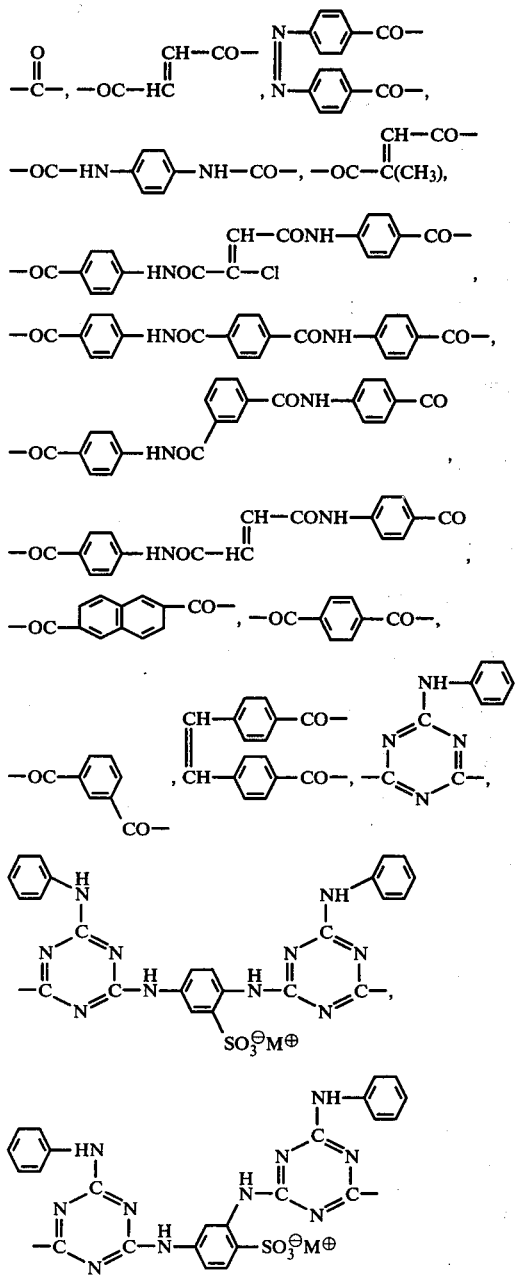

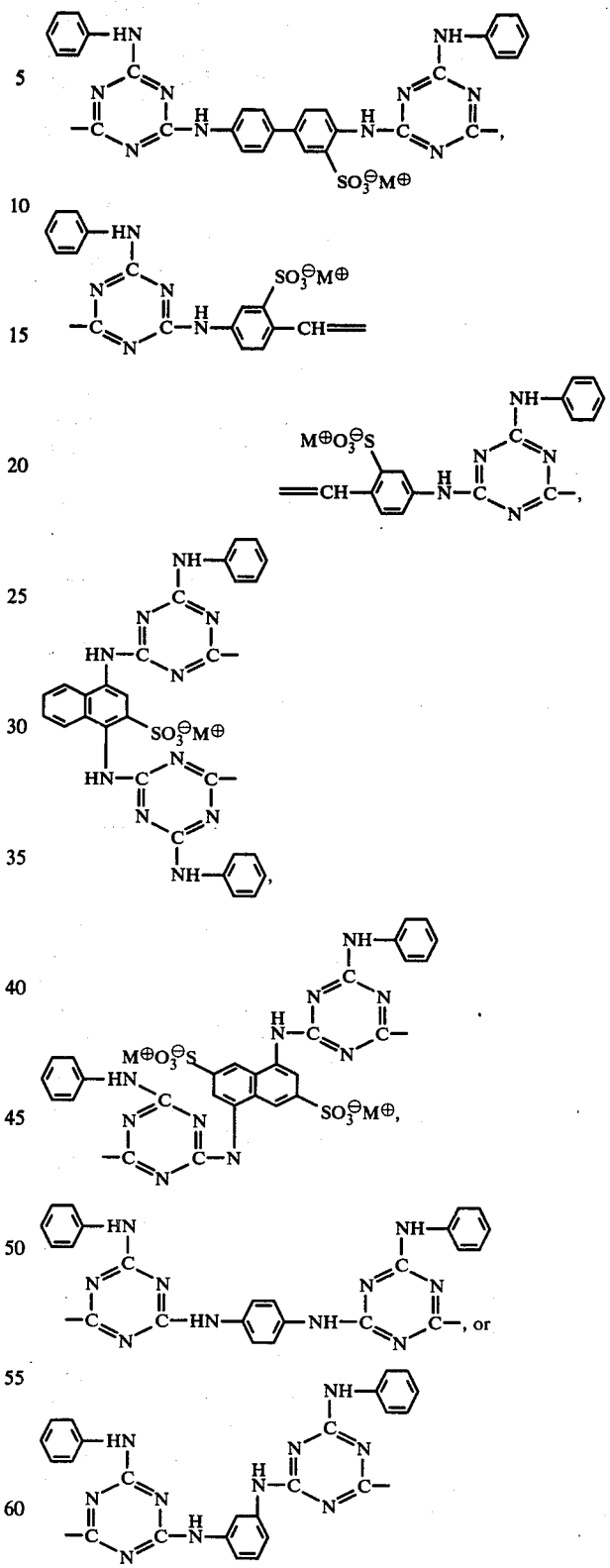

Z represents a salt-forming water solubilizing group dissociating acid in water selected from —SO$_3^\ominus$M$^\oplus$ and —COO$^\ominus$M$^\oplus$, M$^\oplus$ represents hydrogen, sodium, potassium, lithium or ammonium, the grouping —NH—Y—NH— being bond directed to a ring carbon atom of $A_1$, $A_2$, $B_1$, $B_2$, $R_1$ or $R_2$, with the proviso that the total number of salt-forming water solubilizing groups dissociating acid in water present in the dyestuff is from 2 to 6.

2. A bisformazan dyestuff according to claim 1 wherein both formazan radicals are identical.

3. A bisformazan dyestuff as defined in claim 1 wherein $Me_1$ and $Me_2$ represent copper.

4. A heavy-metal-containing bisformazan dyestuff as defined in claim 1 wherein the bridging member —NH—Y—HN— is linked to ring carbon atoms of $B_1$ and $B_2$.

5. A heavy-metal-containing bisformazan dyestuff as defined in claim 1 wherein $A_1$ and $A_2$ each represent an o-phenylene radical either unsubstituted or further substituted by two Z groups, said groups being $SO_3^{\ominus}M^{\oplus}$, $R_1$ and $R_2$ represent phenyl and $B_1$ and $B_2$ represent o-phenylene bearing the bridging member —NH—Y—HN— in p-position to the nitrogen linkage.

6. A bisformazan dyestuff as defined in claim 1 which is of the formula

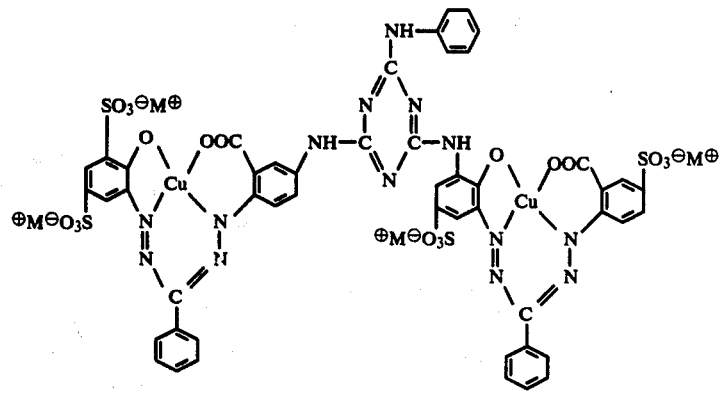

7. A bisformazan dyestuff as defined in claim 1 which is of the formula

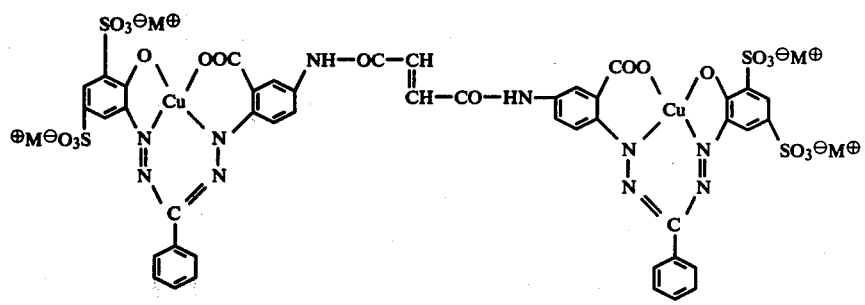

8. A bisformazan dyestuff as defined in claim 1 which is of the formula

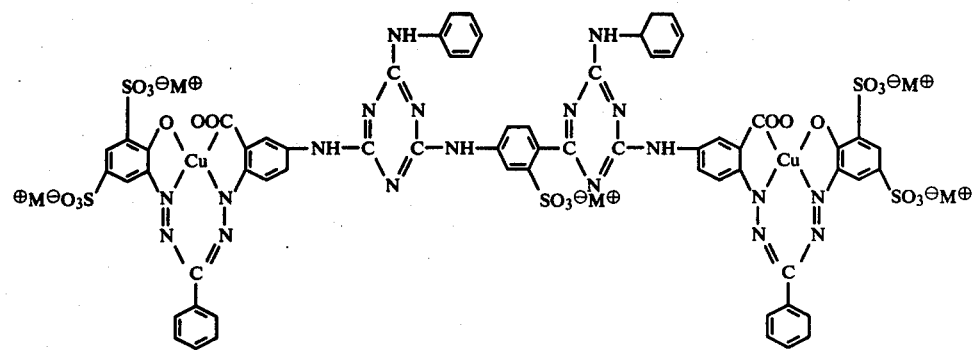

9. A bisformazan dyestuff as defined in claim 1 which is of the formula

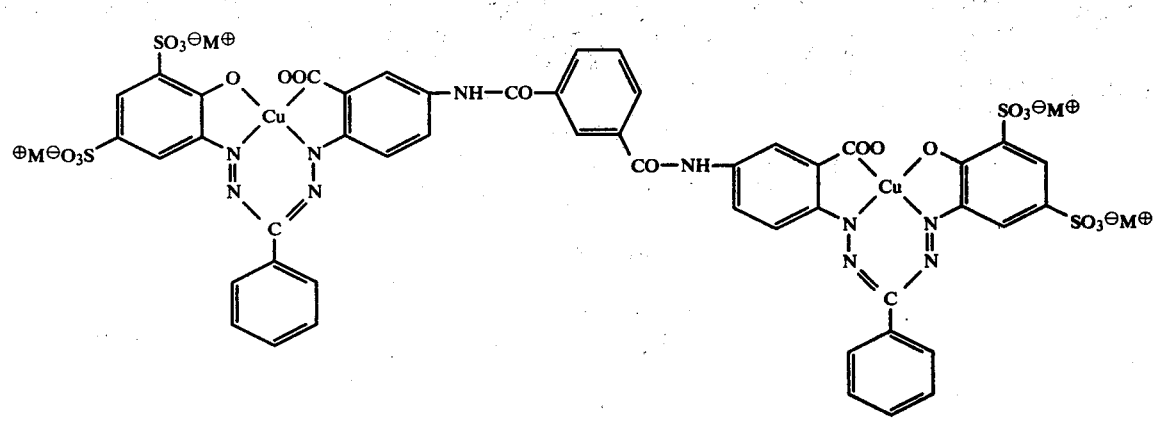
10. A bisformazan dyestuff as defined in claim 1 which is of the formula
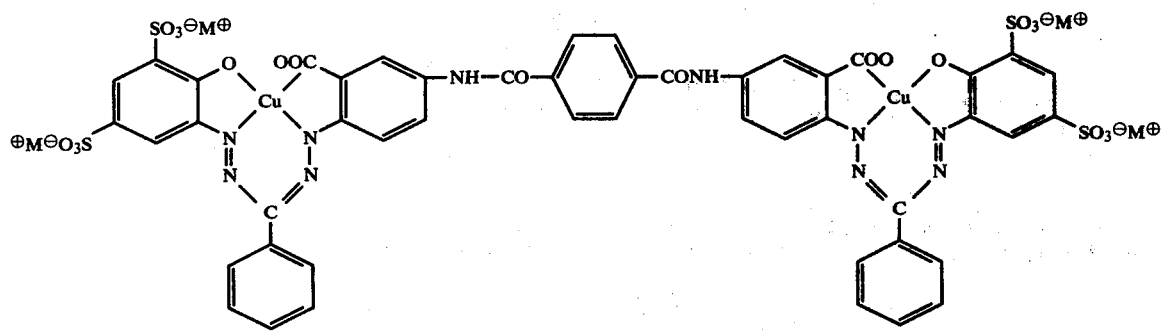
* * * * *